US009767525B2

(12) United States Patent
Geritz et al.

(10) Patent No.: US 9,767,525 B2
(45) Date of Patent: Sep. 19, 2017

(54) METHODS AND SYSTEMS FOR PROVIDING CAREER INSPIRATION, MOTIVATION AND GUIDANCE TO A USER

(71) Applicant: LifeJourney USA, LLC, Baltimore, MD (US)

(72) Inventors: Rick Geritz, Baltimore, MD (US); Karl Gumtov, Baltimore, MD (US); Tracy Martin, Baltimore, MD (US); George Heron, Baltimore, MD (US); Kevin Summerfield, Baltimore, MD (US)

(73) Assignee: LIFEJOURNEY USA, LLC, Baltimore, MD (US)

( * ) Notice: Subject to any disclaimer, the term of this patent is extended or adjusted under 35 U.S.C. 154(b) by 832 days.

(21) Appl. No.: 14/132,757

(22) Filed: Dec. 18, 2013

(65) Prior Publication Data
US 2015/0170303 A1 Jun. 18, 2015

(51) Int. Cl.
*G06Q 10/00* (2012.01)
*G06Q 50/20* (2012.01)

(52) U.S. Cl.
CPC ......... *G06Q 50/205* (2013.01); *G06Q 10/00* (2013.01)

(58) Field of Classification Search
USPC ................................. 705/320, 321, 326–328
See application file for complete search history.

(56) References Cited

U.S. PATENT DOCUMENTS

| | | | | |
|---|---|---|---|---|
| 2005/0042585 A1* | 2/2005 | Eskenazi | ................ | G06Q 10/10 434/219 |
| 2005/0096973 A1* | 5/2005 | Heyse | .................. | G06Q 10/105 705/7.39 |
| 2007/0105080 A1* | 5/2007 | Hersh | ...................... | G09B 7/02 434/236 |
| 2008/0241810 A1* | 10/2008 | Flores | ...................... | G09B 5/00 434/350 |
| 2009/0193083 A1* | 7/2009 | Rea | ......................... | G06Q 10/06 709/205 |
| 2010/0261151 A1* | 10/2010 | Skelton | .................... | G09B 7/00 434/350 |

(Continued)

*Primary Examiner* — Lynda Jasmin
*Assistant Examiner* — Andrew Whitaker
(74) *Attorney, Agent, or Firm* — Venable LLP; Jeffri A. Kaminski

(57) ABSTRACT

Methods, systems, and media are disclosed for providing career motivation, career inspiration and career guidance to a user through one or more journeys. Metrics concerning attention and fact retention of the user after having been presented with one or more career videos on a user device and after the user having responded to career- and skill-specific situational learning exercises and questioning may be recorded in a student record. A career code, such as a Holland Code, may be determined for the user using the responses provided by the user during a career tendency assessment. Metrics of the user's selection of one or more careers may be recorded in the student record. Mentor interaction may be provided for the selected one or more careers and results of the mentor interaction may be stored in the student record. One or more virtual field trips may be provided to the user and results of the one or more virtual field trips may be stored in the student record. A resume may be generated using the student record.

45 Claims, 23 Drawing Sheets

(56) References Cited

U.S. PATENT DOCUMENTS

| | | | |
|---|---|---|---|
| 2010/0285442 A1* | 11/2010 | Ryoo | G06Q 10/10 434/362 |
| 2012/0264099 A1* | 10/2012 | Craft, IV | G09B 7/02 434/350 |
| 2013/0177878 A1* | 7/2013 | Rodriquez | G09B 19/0053 434/118 |
| 2013/0281798 A1* | 10/2013 | Rau | A61B 5/4884 600/301 |
| 2014/0074740 A1* | 3/2014 | Phillips | G06Q 50/205 705/328 |
| 2014/0162238 A1* | 6/2014 | Carney | G09B 7/06 434/350 |

* cited by examiner

[CAREER NAME] DATA ATTRIBUTION TABLE

INSTRUCTIONS FOR USING THIS WORKSHEET

THIS DAT WORKSHEET IS USED BY THE MENTOR (AND/OR THE WIZARD) TO CONSTRUCT THE SEQUENCE OF FIELD TRIPS THAT THE STUDENT TAKES IN FOLLOWING THE JOURNEY. MEASUREMENT CRITERIA IS ESTABLISHED TO DETERMINE PERFORMANCE. THIS IS A ONE-TIME SETUP NEEDED BEFORE A STUDENT CAN BEGIN THE JOURNEY.

STEP 1: IDENTIFY SKILLS - USING THE MASTER (OVERALL) DAT, SELECT THOSE SKILLS THAT ARE APPLICABLE FOR THIS JOURNEY. PUT AN X INTO COLUMN D AND REMOVE ALL OTHER UNNECESSARY SKILL ROWS. AND FEEL FREE TO ADD ADDITIONAL UNIQUE SKILLS THAT ARE DEEMED IMPORTANT FOR THIS JOURNEY.

STEP 2: FT CONSTRUCTION - DETERMINE THE FTs NEEDED FOR EACH LEVEL AND IDENTIFY THEM AT THE TOP OF THE MAJOR FT COLUMNS (E:H, I:L, ETC.)

STEP 3: FT TESTS - WITHIN EACH FT, DETERMINE THE TEST(S) STUDENTS WILL TAKE, AND CORRESPONDINGLY THE MEASUREMENTS TO BE COLLECTED. THESE WILL BE ENTERED IN ROW 4 FOR EACH FT.

STEP 4: MAX SCORE - FOR EACH FT TEST, IDENTIFY THE MAX SCORE ACHIEVABLE FOR A GIVEN TEST AND PLACE IT INTO ROW 5. THIS, THE ACTUAL SCORE ACHIEVED FOR THE TEST DURING THE JOURNEY EXECUTION) CAN HAVE THIS VALUE AT MOST, AND IS COMPARED TO THE MAX TO DETERMINE THE FT GRADE. THE SCORE ALSO BECOMES THE JOURNEY POINTS ACHIEVED FOR THE FT, SO SELECT THE MAX VALUE WITH ATTENTION TO VALUE AND COMPLEXITY OF THE FT. (EASIER FTs IN THE EARLIER FTs OF A JOURNEY WILL GENERALLY HAVE LOWER VALUES THAN THE MAX VALUES OF MORE COMPLEX FTs DOWNSTREAM.)

| | | | FT #1: MEET THE MENTOR 1030-1 | | FT #2: SETUP OFFICE 1030-2 | | FT #3: CLEARABLE 1030-n | | |
|---|---|---|---|---|---|---|---|---|---|
| | | OVERALL SKILLS NEEDED | TEST 1: RESPONSE | TEST 2: QUIZ | TEST 1: INSTALL | TEST 2: QUIZ | TEST 1: INSTALL+QUIZ | TEST 2: CLEARABLE RANGE | TEST 1: MAX |
| | | | MAX: 2 | MAX: 1.5 | MAX: 2 | MAX: 1.5 | MAX: 1.5 | MAX: 3 | |
| | | | SCORE: 1.2 | SCORE: 0.9 | SCORE: 1.6 | SCORE: 0.5 | SCORE: 1.5 | SCORE: 1.75 | SCORE: |
| | | | JOURNEY PTS: 2.1 | | JOURNEY PTS: 2.1 | | JOURNEY PTS: 3.25 | | JO |
| | | | GRADE: 60% | | GRADE: 80% | | GRADE: 72% | | |
| | | X | WEIGHT: PERFORMANCE | | WEIGHT: ?% | | WEIGHT: | | WEIGHT: |
| HARD SKILLS | MATH | ALGEBRA | | | | | | | |
| | | GEOMETRY | | | | | | | |

1090 — LEVEL 1 FIELD TRIPS: INTRODUCTION &  FT

FROM FIG. 10A

| | | | | | | | | | | |
|---|---|---|---|---|---|---|---|---|---|---|
| PHYSICS | CALCULUS | X | WEIGHT: 20% | PERFORMANCE: | WEIGHT: | PERFORMANCE: | WEIGHT: | PERFORMANCE: | WEIGHT: | PERFORMANCE: |
| | TRIGONOMETRY | X | WEIGHT: 33% | PERFORMANCE: 12.0% | WEIGHT: | PERFORMANCE: | WEIGHT: | PERFORMANCE: | WEIGHT: | PERFORMANCE: |
| | STATISTICS | X | WEIGHT: 10% | PERFORMANCE: 19.8% | WEIGHT: | PERFORMANCE: | WEIGHT: | PERFORMANCE: | WEIGHT: | PERFORMANCE: |
| | BIO | | WEIGHT: | PERFORMANCE: 6.0% | WEIGHT: | PERFORMANCE: 1.2% | WEIGHT: | PERFORMANCE: | WEIGHT: | PERFORMANCE: |
| | PHYSICAL | | WEIGHT: | PERFORMANCE: | WEIGHT: 15% | PERFORMANCE: | WEIGHT: | PERFORMANCE: | WEIGHT: | PERFORMANCE: |
| | ASTRO | X | WEIGHT: | PERFORMANCE: | WEIGHT: | PERFORMANCE: 9.0% | WEIGHT: 10% | PERFORMANCE: 7.2% | WEIGHT: | PERFORMANCE: |
| | MECHANICAL | | WEIGHT: | PERFORMANCE: | WEIGHT: 10% | PERFORMANCE: | WEIGHT: | PERFORMANCE: | WEIGHT: | PERFORMANCE: |
| | QUANTUM | | WEIGHT: | PERFORMANCE: | WEIGHT: | PERFORMANCE: 6.0% | WEIGHT: | PERFORMANCE: | WEIGHT: | PERFORMANCE: |
| | THEORETICAL | X | WEIGHT: | PERFORMANCE: | WEIGHT: 33% | PERFORMANCE: 19.3% | WEIGHT: | PERFORMANCE: | WEIGHT: | PERFORMANCE: |
| | EXPERIMENTAL/APPLIED | | WEIGHT: | PERFORMANCE: | WEIGHT: | PERFORMANCE: | WEIGHT: | PERFORMANCE: | WEIGHT: | PERFORMANCE: |
| | PARTICLE | | WEIGHT: | PERFORMANCE: | WEIGHT: | PERFORMANCE: | WEIGHT: | PERFORMANCE: | WEIGHT: | PERFORMANCE: |
| | NUCLEAR | | WEIGHT: | PERFORMANCE: | WEIGHT: | PERFORMANCE: | WEIGHT: | PERFORMANCE: | WEIGHT: | PERFORMANCE: |
| CHEMISTRY | ANALYTICAL | | WEIGHT: | PERFORMANCE: | WEIGHT: | PERFORMANCE: | WEIGHT: | PERFORMANCE: | WEIGHT: | PERFORMANCE: |
| | QUANTUM | | WEIGHT: | PERFORMANCE: | WEIGHT: | PERFORMANCE: | WEIGHT: | PERFORMANCE: | WEIGHT: | PERFORMANCE: |
| | PHYSICAL | X | WEIGHT: | PERFORMANCE: | WEIGHT: | PERFORMANCE: | WEIGHT: 20% | PERFORMANCE: 14.4% | WEIGHT: | PERFORMANCE: |

FIG. 10B

Accomplishment Summary

STUDENT REPORT

| ACCOMPLISHMENTS | Score | Badges Earned |
|---|---|---|
| 1) Business Accumen *(Online collaboration)* | 75% | |
| *Communication etiquette in professional world* | | |
| *Business partnership initiation techniques* | | |
| 2) Architectural Layout *(via AutoSketch)* | 67% | |
| *Layout of office with CAD design package* | | |
| 3) Social Media Responsibility *(Clearable)* | 96% | |
| *How to install a Facebook application* | | |
| *How to view, assess and improve social media profile* | | |
| 4) Networking Basics | 88% | |
| *How to determine and use IP Addressing to route traffic* | | |
| *How subnet masks are used for segmentation & isolation* | | |
| 5) Forensic Tracking Techniques | 85% | |
| *How to obfuscate, reveal or convert codes & addresses* | | |
| *Learn different codes: Morse, Braille, DTMF, hex-binary, GPS* | | |
| *How to encrypt & decrypt messages using industry standards* | | |
| 6) Forensic Evidence Discovery | 90% | |
| *How to use Codecademy to design diagnostic software tools* | | |
| *How to reverse engineer hacker's code to find stolen data* | | |
| *Overall Score:* | 84% | |
| *Journey Points:* | 27 | |

FIG. 11A

Skills Assessment

| SKILLS ASSESSMENT | | | |
|---|---|---|---|
| 1) Hard Skills | Math | Algebra | 10% |
| | | Geometry | 10% |
| | | Calculus | 6% |
| | | Statistics | 14% |
| | Computer | Cyber Security | 25% |
| | | Network Technology | 14% |
| | | Computer Science | 20% |
| | Programming | C | 8% |
| | | Java | 10% |
| | | Assembly | 12% |
| 2) Soft Skills | Communication | Written | 22% |
| | | Interpersonal | 5% |

FIG. 11B

FIELD TRIP PERFORMANCE

| FIELD TRIP | LEVEL | MAX | METRICS BEING MEASURED | MAX FOR ASSESSMENT | VALUE ASSIGNED | ALGORITHM FOR ASSIGNING VALUE |
|---|---|---|---|---|---|---|
| 1) MEET THE MENTOR: RESPOND TO MENTOR IN ????? ??????? | L1 | 2 | RESPONSE | 1 | 1 | 1: GET RESPONSE<br>0: NO RESPONSE<br>0.5: ELAPSED TIME < 24 HOURS<br>0: ELAPSED TIME > 24 HOURS |
| | | | WITHIN 24 HRS | 1 | 0.5 | |
| | | | | 2 | | |
| | | | FT SCORE (JOURNEY POINTS) = | | 1.5 | |
| | | | GRADE = | | 75% | |
| | | | SKILLS USED ON THIS FIELD TRIP: | | *WEIGHT* | |
| | | | SOFT SKILLS, COMMUNICATION, WRITTEN | | 23% | |
| | | | SOFT SKILLS, COMMUNICATION, INTERPERSONAL | | 20% | |
| | | | SOFT SKILLS, RELATIONSHIPS, RESPECT | | 5% | |
| | | | SOFT SKILLS, ORGANIZING, TIME MANAGER | | 10% | |
| | | | SOFT SKILLS, PRIORITIZES JOBS | | 5% | |
| | | | SOFT SKILLS, PROBLEM SOLVING, ACCEPT OWNERSHIP | | 5% | |
| | | | SOFT SKILLS, GRIT SELF CONFIDENT | | 10% | |
| | | | SOFT SKILLS, TEAMWORK, COOPERATIVE | | 5% | |
| | | | SOFT SKILLS, WORK ETHIC, CONSCIENTIOUS | | 10% | |
| | | | ENTREPRENEURIAL, TEAM PLAYER | | 5% | |
| | | | TOOLS, SOCIAL TEXT | | 2% | |
| | | | | | 100% | |

| Holland Codes for Forensic Analysts: | | | | | | |
|---|---|---|---|---|---|---|
| Holland Code (first 3 positions) | Derived Holland Di-code | Derived Multiples | | | | |
| IRS | IR | 1.00 | 1.00 | 1.00 | 1.00 | 1.00 |
| RIA | IA | 0.90 | 0.90 | 0.90 | 0.90 | 0.90 |
|  | IS | 0.90 | 0.90 | 0.90 | 0.90 | 0.90 |
|  | RA | 0.75 | 0.75 | 0.75 | 0.75 | 0.75 |
|  | RS | 0.75 | 0.75 | 0.75 | 0.75 | 0.75 |
|  | SA | 0.50 | 0.50 | 0.50 | 0.50 | 0.50 |

Legend: I = Investigative, R = Realistic, A = Artistic, S = Social

| STEAM Categories | | Science | Tech | Engineer | Arts | Math |
|---|---|---|---|---|---|---|
| Mentor's STEAM Hard Skills Profile | | 0.7 | 0.8 | 0.5 | 0.5 | 0.4 |
| 1610 | 25% | 0.18 | 0.20 | 0.13 | 0.13 | 0.10 |
|  | IR | 0.18 | 0.20 | 0.13 | 0.13 | 0.10 |
|  | IA | 0.16 | 0.18 | 0.11 | 0.11 | 0.09 |
|  | IS | 0.16 | 0.18 | 0.11 | 0.11 | 0.09 |
|  | RA | 0.13 | 0.15 | 0.09 | 0.09 | 0.08 |
|  | RS | 0.13 | 0.15 | 0.09 | 0.09 | 0.08 |
|  | SA | 0.09 | 0.10 | 0.06 | 0.06 | 0.05 |

Legend: I = Investigative, R = Realistic, A = Artistic, S = Social

| | STEAM Categories | | Science | Tech | Engineer | Arts | Math |
|---|---|---|---|---|---|---|---|
| 1610 | Selected Trailer | | 0.16 | 0.18 | 0.11 | 0.11 | 0.09 |
|  | Quiz Points | 0.35 | 0.21 | 0.24 | 0.15 | 0.15 | 0.12 |
|  | Rating (5-Stars) | 0.25 | 0.27 | 0.30 | 0.19 | 0.19 | 0.15 |
|  | Final STEAM-Gauge of 1st Career | | 0.27 | 0.30 | 0.19 | 0.19 | 0.15 |

FIG. 17

METHODS AND SYSTEMS FOR PROVIDING CAREER INSPIRATION, MOTIVATION AND GUIDANCE TO A USER

BACKGROUND

Traditional mentorship is bound by the physical limitations of time, physical presence, and qualifications of the mentor. Thus, only a handful of students may benefit from mentoring guidance of an expert or educator. From a career direction standpoint, a traditional mentor is often not best suited to address and provide guidance for the wide variety of technology career opportunities available to today's students. Career opportunities for cyber- and STEM-related jobs are the ones that the U.S. critically needs to fill in order to maintain a leading role in the world economy. What is needed is a new type of mentorship experience that is not bound by traditional physical limitations and that can provide inspiration, motivation and guidance for the multitude of career opportunities available to students.

SUMMARY

Various embodiments are generally directed to providing career guidance to a user to overcome the aforementioned problems.

One or more embodiments may include a method for providing career guidance to a user through one or more journeys, the method comprising: recording in a student record metrics concerning attention and fact retention of the user after having been presented with one or more career videos on a user device and after the user having responded to career video questions; determining a career code for the user using the responses provided by the user during a career tendency assessment; recording in the student record metrics of the user's selection of one or more careers; providing mentor interaction for the selected one or more careers and storing results of the mentor interaction in the student record; providing one or more virtual field trips to the user and storing results of the one or more virtual field trips in the student record; and generating a resume using the student record.

One or more embodiments may include system for providing career guidance to a user through one or more journeys, system comprising: a memory; and a processor coupled to the memory, the processor being configured to: record in a student record metrics concerning attention and fact retention of the user after having been presented with one or more career videos on a user device and after the user having responded to career video questions; determine a career code for the user using the responses provided by the user during a career tendency assessment; record in the student record metrics of the user's selection of one or more careers; provide mentor interaction for the selected one or more careers and store results of the mentor interaction in the student record; provide one or more virtual field trips to the user and store results of the one or more virtual field trips in the student record; and generate a resume using the student record.

One or more embodiments may include a computer readable storage medium comprising instructions that if executed enables a computing system to: record in a student record metrics concerning attention and fact retention of the user after having been presented with one or more career videos on a user device and after the user having responded to career video questions; determine a career code for the user using the responses provided by the user during a career tendency assessment; record in the student record metrics of the user's selection of one or more careers; provide mentor interaction for the selected one or more careers and store results of the mentor interaction in the student record; provide one or more virtual field trips to the user and store results of the one or more virtual field trips in the student record; and generate a resume using the student record.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIG. 10 depicts an exemplary data attribution table 1000 in accordance with one or more embodiments.

FIGS. 11A-11C depict exemplary student dashboard calculations in accordance with one or more embodiments.

FIG. 15 depicts an exemplary factors table 1500 in accordance with one or more embodiments.

FIG. 16 depicts an exemplary hard skills value table 1600 in accordance with one or more embodiments.

FIG. 17 depicts an exemplary STEAM-Gauge data table 1700 in accordance with one or more embodiments.

DETAILED DESCRIPTION OF THE DRAWINGS

Figure 1:
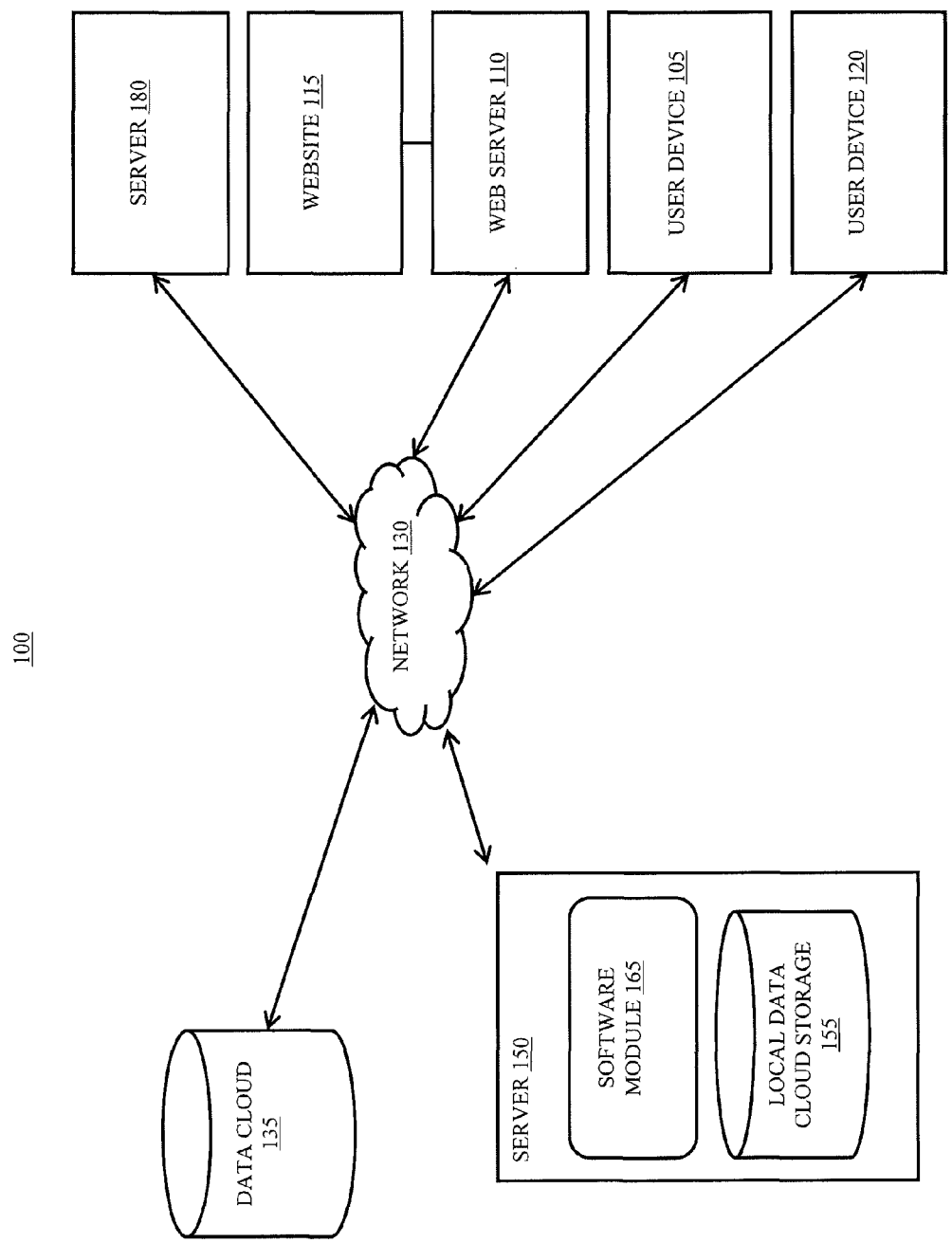
FIG. 1 depicts a block diagram of an exemplary system 100 in accordance with one or more embodiments.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Disclosed is an online career simulation and mentorship platform, such as LifeJourney™, that helps students find their passion, and enables organizations to dramatically extend the reach of their community initiatives. The platform enables a single mentor to touch the lives of millions of students, inspire them about their future, and provide the sustaining motivation necessary to transform future generations. The platform helps students discover their passion, test-drive future career opportunities, gain exposure to the skills they'll need to achieve their dreams, and help them better answer the age-old question, "What do you want to be when you grow up?"

The platform enables a student to "experience a day in the life" of a mentor from any number of leading technology companies, thus giving the student a chance to see and experience what a subject matter expert (such as a Mentor) routinely does, the tools normally used, and the skills notably demonstrated while performing in the specific technology career role being explored.

Journeys may be created within the platform to motivate a student's quest for knowledge by aligning their innate passion with an educational experience connected to a real life career. A company may create a journey for a particular career by developing a series of informative and exploratory exercises that, over a period of time, progress a student along a path of increasing awareness, discovery and excitement, thus potentially leading to it being a lifelong career for the student.

Ideation may refer to the process facilitated by the platform whereby students explore the richness of careers, the required skills, and the day-to-day activities of a mentor performing in that role. Students may view short video trailers produced by the companies sponsoring the many journeys presented to the student. These video trailers may inform and motivate the student to dig deeper into this career, and thus provide a small taste of a potential professional life.

When a student finds a career of interest through his review of various career trailers in the Ideation phase, the student may be able to then to embark on that journey. The student is then connected with a professional doing that actual job within the company sponsoring that journey. This professional subject matter expert at the company may advise and interact with the students to guide him through the journey. An automated response/guidance system, e.g. the Mentor Management System, may be used to enable this single company mentor to simultaneously mentor any number of students, e.g. 100,000's of students, taking the company's journey over multiple months/years, with only a small commitment of time. Students may receive online guidance from mentors by receiving interactive project based Field Trips specific to that journey.

A Field Trip may refer to a series of informative and motivational exercises that a student follows over the course of a journey. A given journey may comprise a sequence of many field trips designed to be increasingly meaningful and motivational for that career, its tools, and/or professional responsibilities. Thus, a journey can span multiple months or even years, and potentially even lead to an internship or permanent employment with the sponsoring company. While a student engages in Field Trips, the student's growth across a wide-ranging set of skills (e.g. hard, soft, entrepreneurial and tools) commonly used in the profession may be recorded and/or assessed. Badges are awarded at times to inspire and motivate a student's progress. JourneyPoints may be issued to recognize granular individual achievements as a student progresses through field trips, and may be incrementally used in other motivational ways (e.g., discounts at local stores, etc.).

The video trailers and the subsequent series of informational and motivating exercises that follow for the student in a given career/journey may be created using a Wizard, such as an automated mechanism that utilizes the company's job description and other industry information to construct field trips using the skillsets needed and/or desired for a student to be ultimately successful in that industry. The Wizard may assist companies in defining and constructing unique and effective journeys by assessing the job and/or skillset requirements, and then recommending the selection and use of field trips from a Field Trip Catalog. The Wizard accepts specific career, personality, and personal information (e.g., education degrees, professional certifications, skill requirements) from the mentor, and populates the Mentor Knowledge Base with a structured representative embodiment of a professional in this career. Further, the Wizard accepts additional input from the mentor via an automated interviewing mechanism that collects various pedagogical information (e.g., work experience, hobbies, work style, tool preferences) and constructs multi-level Branching Stories (situational learning exercises) that are used when iterating with students during question and answer periods after the career video has been viewed and during related Field Trips. Finally, the Wizard may then overlay a test and evaluation scheme over the selected (or custom-created) field trips to create the ultimate journey using this collected information as data fitting into a proven template to create interactive student experiences with hooks for performance metric collection.

The Engine and/or Mentor Management system may compute the student's overall performance across many skillsets that may be tested and measured throughout the field trips, and dynamically displays the aggregate performance for each skill. A Data Attribution Table may serve as an active repository of information describing the journey in detail of skills, field trips, and measurements that may ultimately be used to assess a student's performance. The company's mentor, or the Wizard, may initially populate the table when the journey is constructed, and the table may identify the skills and test results and/or measurements that will be collected within in each Field Trip. The Engine may then use data pre-entered into the table, along with the skillset measurements dynamically collected throughout the journey, to compute and represent student performance over the full range of skills. The Engine may grade each Field Trip according to test criteria specified by the mentor, apply the grade against the skills specifically used in that field test, compute the weighted average of those skill assessments, and add them to the aggregate listing of individual skillset performance.

Student aggregate skillset performance may be dynamically shown at any time within the Student Dashboard. The badges and JourneyPoints earned throughout all field trips may also be shown in the dashboards. Student performance may be presented for visual display using bar charts to show relative strengths and weaknesses across all skillset categories in the Student Dashboard. Dashboards may also exist for other users of the platform, and the dashboards may display student and journey performance from the perspective of parents, teachers, mentor and the sponsoring corporation.

The STEM Resume, as a summary representation of the student's performance along the skill categories of Science, Technology, Engineering and Mathematics, is the culmination of the Ideation experience. The category of "Arts" may at times also be considered as part of the student's performance representation, resulting in the acronym "STEAM". With the STEM Resume, the student's collective performance, interest, and aptitude indicators are represented in a standard way that shows, for example: career preference; skillset strengths as compared to those of the corresponding career mentor; industry-accepted and meaningful measures of the student's career tendencies; award/badge/certificate achievements from industry companies sponsoring the career journeys; and a technology roadmap/curriculum of related Field Trips that the student would follow for continued exploration of careers. The STEM Resume may be dynamic in the sense that it continuously represents these various dimensions and attributes of the student's career exploration, starting from the very first Ideation experience, and through the numerous follow-on combinations of industry-sponsored Field Trips that can lead to internship and full-time employment opportunities. The STEM Resume may become the student's passport to future economic success in industry, while simultaneously serving as an overarching guide through the maze of technologies and competing educational pathways. Teachers, parents, and potential employers also benefit from a student's STEM Resume, in that they too are able to see and take action on the dynamic and ever-changing montage of a student's evolving STEM maturity. As the student becomes better able to articulate and become credentialed for a given technology, career, and/or industry, those surrounding the student are better able to guide and nurture that growth. With a STEM Resume, a student is able to turn dreams and aspirations of a prosperous future career into a tangible reality.

FIG. 1 depicts a block diagram of an exemplary system 100 in accordance with one or more embodiments. System 100 may include user device 105, web server 110, website 115, user device 120, network 130, data cloud 135, server 150, local data cloud storage 155, software module 165, and server 180.

User device 105 and user device 120 may be, without limitation, any type of computing device, including a mobile telephone, a laptop, tablet, or desktop computer having, a netbook, a video game device, a pager, a smart phone, an ultra-mobile personal computer (UMPC), or a personal data assistant (PDA). User device 105 and user device 120 may run one or more applications, such as Internet browsers, voice calls, video games, videoconferencing, and email, among others. User device 105 and user device 120 may be any combination of computing devices. These devices may be coupled to network 130.

Web server 110, server 150, or server 180 may also be any type of computing device coupled to network 130, including but not limited to a personal computer, a server computer, a series of server computers, a mini computer, and a mainframe computer, or combinations thereof. Web server 110, server 150, or server 180 may be a web server (or a series of servers) running a network operating system, examples of which may include but are not limited to Microsoft Windows Server, Novell NetWare, or Linux. Any of the features of server 150 may be also implemented in server 180.

Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof Website 115 may be any type of website or web page. For example, website 115 may be coded using hypertext markup language ("HTML"), XML, XHTML, JavaScript, Java, Perl, Visual Basic, Hypertext Preprocessor scripts ("PHP"), Active Server Page scripts ("ASP"), common gate interface ("CGI") scripts, server side includes, and combinations thereof Data cloud 135 and/or local data cloud storage 155 may be any combination of hardware or software used to store information in a distributed and redundant manner. Data cloud 135 and/or local data cloud storage 155 may be implemented in or managed by server 150 as local data cloud storage 155, server 180, other servers, or any combination thereof. Data cloud 135 and/or local data cloud storage 155 may be distributed across a number of devices, in which each device may replicate all of the data or portions of the data stored on any combination of devices used by data cloud 135 and/or local data cloud storage 155. Data cloud 135 and/or local data cloud storage 155 may be configured to be updated in real-time when one or more of the devices housing data cloud 135 and/or local data cloud storage 155 receives new data. For example, when information is added to or stored on data cloud 135 and/or local data cloud storage 155 by server 150, the information may be distributed to other servers maintaining data cloud 135 and/or local data cloud storage 155 in real-time. Data cloud 135 and/or local data cloud storage 155 may be configured to store any type or combination of data. Data cloud 135 and/or local data cloud storage 155 may be configured to only store data for a certain period of time.

Data cloud 135 and/or local data cloud storage 155 may be implemented using any type of database, including databases managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation, such as Hadoop or MongoDB. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Software module 165 may be a module that is configured to send, process, and receive information at server 150. Software module 165 may provide another mechanism for sending and receiving data at server 150 besides handling requests through web server 110. Software module 165 may send and receive information using any technique for sending and receiving information between processes or devices including using a scripting language, a remote procedure call, an email, a tweet, an application programming interface, Simple Object Access Protocol (SOAP) methods, Common Object Request Broker Architecture (CORBA), any interface for software components to communicate with each other, using any other known technique for sending information from a one device to another, or any combination thereof. Software module 165 may implement any or all of the software functionalities described herein. For example, software module 165 may implement any or all of the processes or modules described herein, such as those depicted in FIG. 2 or any other depicted modules, which are further discussed below. Software module 165 may also implement any or all of the interfaces or processes depicted in FIGS. 2-19, which are further discussed below.

In one or more embodiments, the platform may be implemented as a cloud-based software application with which schools enable students to "test drive" future careers by living a day in the life of one of the mentors. This experience enhances existing school curriculum by connecting what students learn in the classroom to a future career in STEM (Science, Technology, Engineering, and Math).

Ideation may be experienced by the student using a web browser connected to the platform portal. It is not necessary to have a specific software application, software client, software driver, or hardware pre-loaded onto the student computer.

In one embodiment, Ideation may be conducted during a single class period, typically fifty minutes in duration, for a student, and may not impact or add overhead to the existing curricula established by the teachers for the semester.

The platform may be automated, self-contained, completely cloud-based (no installation or set-up is required), and may not require teacher/instructor guidance once Ideation has begun. Ideation may typically be run by a teacher during a technology or computer lab class period where the students have access to the school's computer resources. Some schools may conduct STEM Ideation in a larger general assembly setting with students using portable devices. Either way, after a one-time introduction of Ideation to students, students may be able to continue the Ideation process on their own.

At a macro level, the Ideation sequence may include student registration, viewing of introductory videos, question and answer (Q&A) through interactive Branching Story pedagogical dialogue (i.e., a situational learning experience) with the automated Mentor Management sub-system (hereafter referred to as the Mentor), and then selecting, viewing and answering questions from the Mentor for three (typically) career video trailers within the allotted class period. The overall Ideation process may conclude with a follow-on session conducted by the teacher after the teacher downloads the STEM Resumes from the platform for each student in that Ideation session. Additional Ideation sessions may be conducted by the teacher at a later date, wherein students are able to explore three additional careers, thus providing an ever-expanding exposure to new career experiences, while enabling the Mentor Management System and Engine to collect additional student performance data to create increasingly meaningful STEM Resumes.

Figure 2:
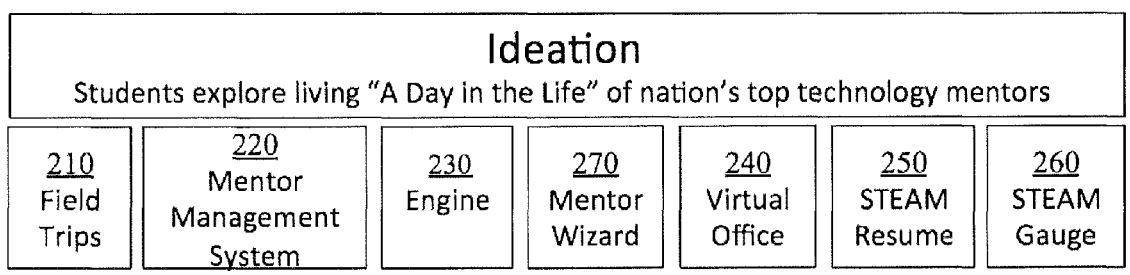
FIG. 2 depicts a block diagram of an exemplary platform modules 200 in accordance with one or more embodiments.

FIG. 2 depicts a block diagram of an exemplary platform modules 200 in accordance with one or more embodiments. The corresponding collection of the platform's capabilities can be depicted as residing under an overarching umbrella called ideation, with its primary modules, e.g. platform modules 200, being represented as supporting the platform. Platform modules 200 may include a field trips module 210, a mentor management system 220, engine 230, virtual office module 240, STEM Resume module 250, STEAM gauge module 260, and wizard 270. These platform modules 200 are unique and powerful in the industry, and may be designed to: inspire and motivate a STEM-generation of students to achieve better scores in the global classroom; be scalable to be used to engage and motivate more than 40 million students across America; provide a platform for engaging America's top corporate leadership in the educational success of our youth, while simultaneously allowing them to invest in and cultivate an environment to grow tomorrow's technology workforce; and provide an awareness in our nation's youth regarding the wealth of available STEM-technology jobs, and the pathways to achieve internships and employment, thus enabling them to answer the questions "What do you want to be when you grow up?"

Figure 3A:
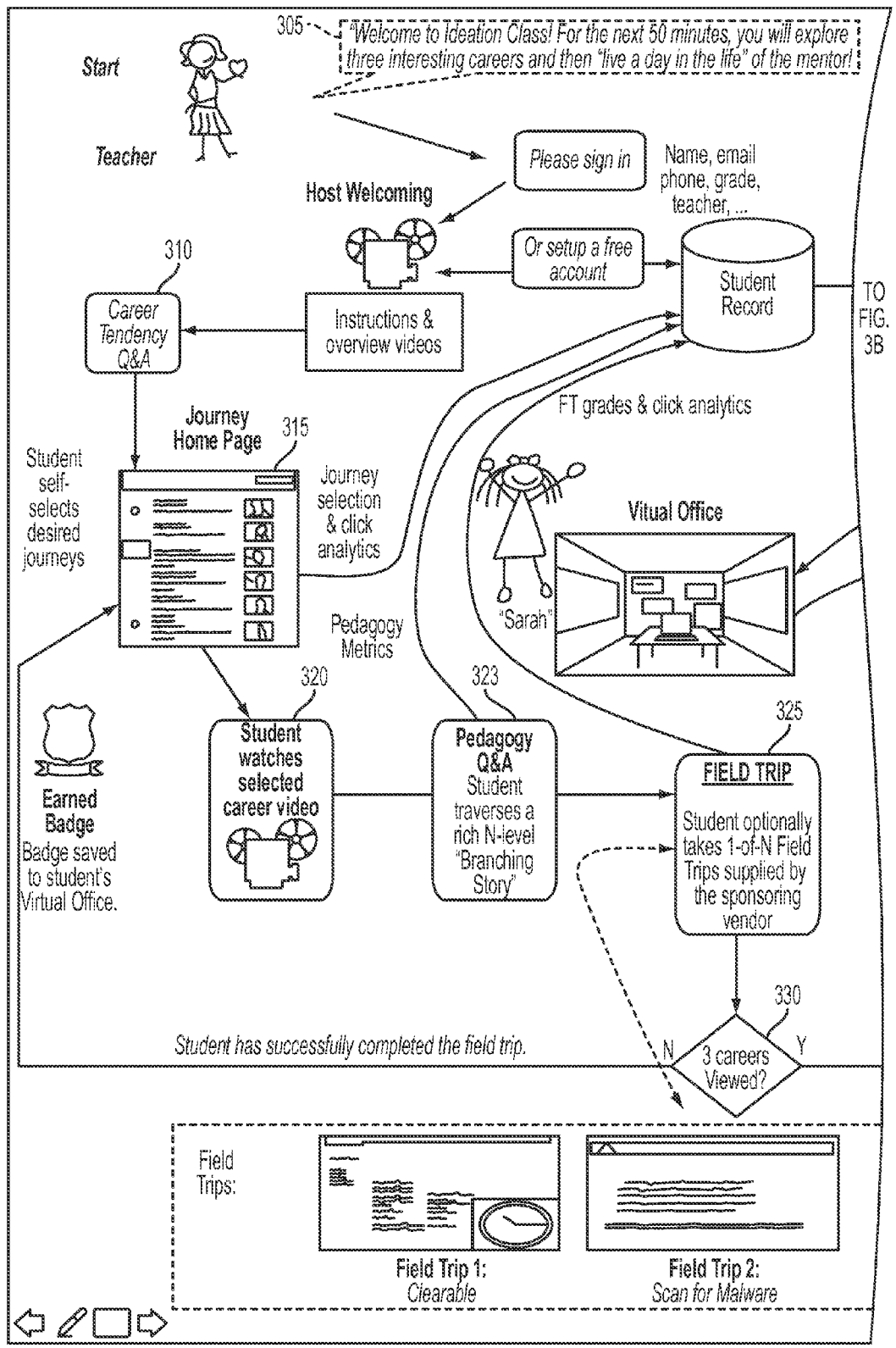
FIG. 3 depicts a diagram of an exemplary user flow 300 as a student progresses though the ideation experience in accordance with one or more embodiments.
Figure 3B:
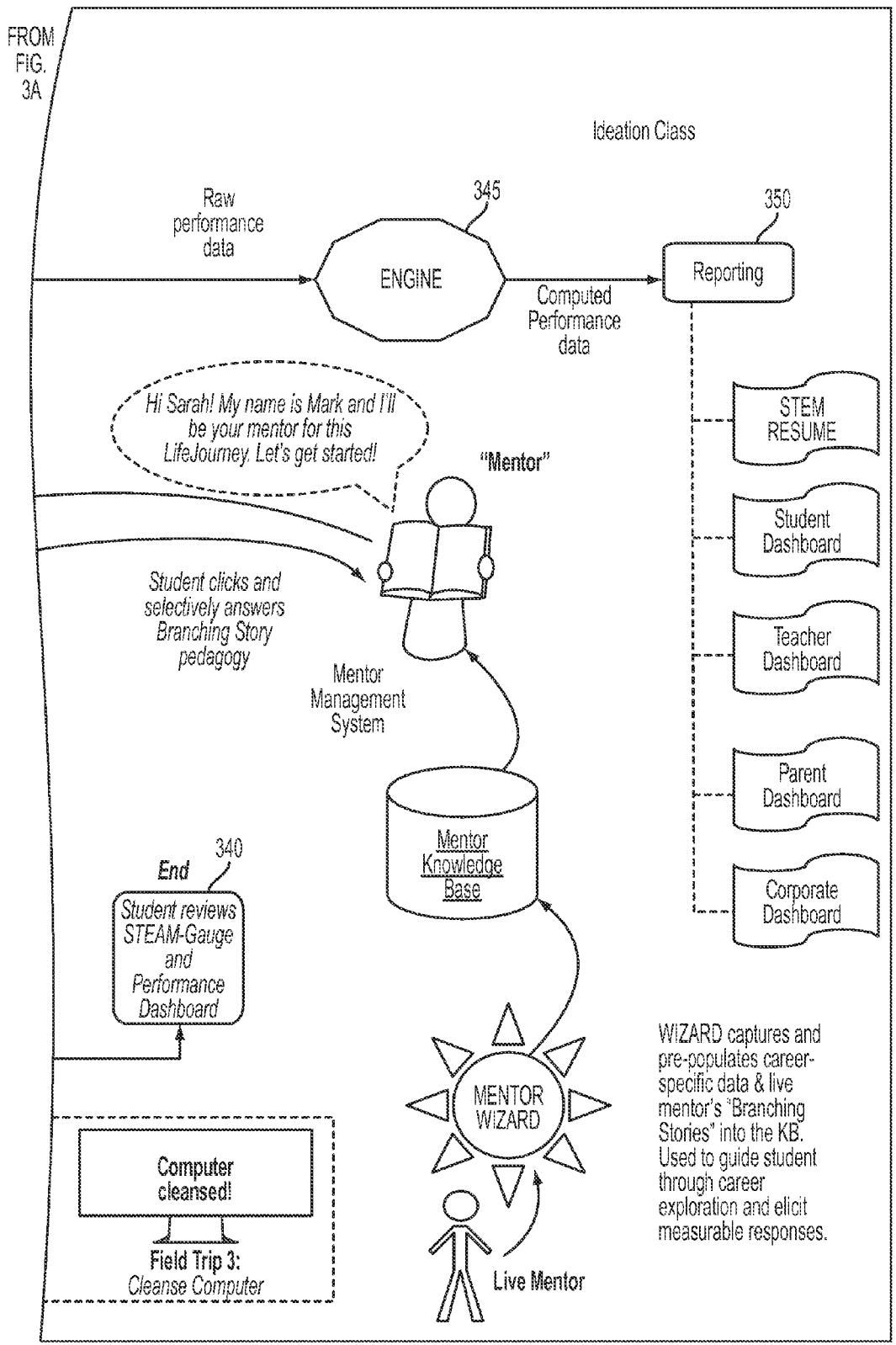

FIG. 3 depicts a diagram of an exemplary user flow 300 as a student progresses though the ideation experience in accordance with one or more embodiments. Example dialogues are depicted as occurring among the teacher, student, and Mentor, and platform modules 200 are illustrated in contextual use. In block 305, a teacher may instruct a user to sign into the platform, to follow the automated Host instructions for Ideation usage, and then view specific videos that overview Ideation from a user perspective. In block 310 the student may answer the Career Tendencies questions which provides initial baseline information to the Engine for computing student performance and the STEM Resume. In block 315, the student may browse available careers in order to find one that is of interest, and then self-select that career for continued exploration. In block 320, the student may view the career video and then interact with the Mentor Management System as the multi-level Branching Story 323 (pedagogical sequencing of information disclosure and student questioning conducted during situational learning exercises) is experienced by the student. In block 325, the student may embark on a Field Trip experience related to the career video and pedagogical Q&A just encountered. The Field Trip may consist of additional videos and activities designed initially by the mentor to test and stress the student's skills in career-related areas and in career-typical scenarios, all while the Mentor Management System collects the related performance metrics and places them into the Student Record for later use by the Engine. In block 330, it is determined if the student has encountered three career experiences yet for this Ideation session; if not, the student is directed back to block 315, in order to self-select another career. However, if three careers have been experienced, the student flow continues on to the next block. In block 340, the student is presented with his computed STEAM Gauge and performance dashboard. The student's Ideation session ends at this point. In block 345, the Engine pulls raw performance data from the Student Record and computes student performance. In block 350, multiple reports are dynamically generated from the Engine computations, resulting in dashboards for the use of different stakeholders in the educational and business process: the student, the parents, the teacher and the sponsoring company for this LifeJourney. Additionally, the student's STEM Resume is generated and may be used by the teacher when next meeting with the student and/or parents.

Figure 4:
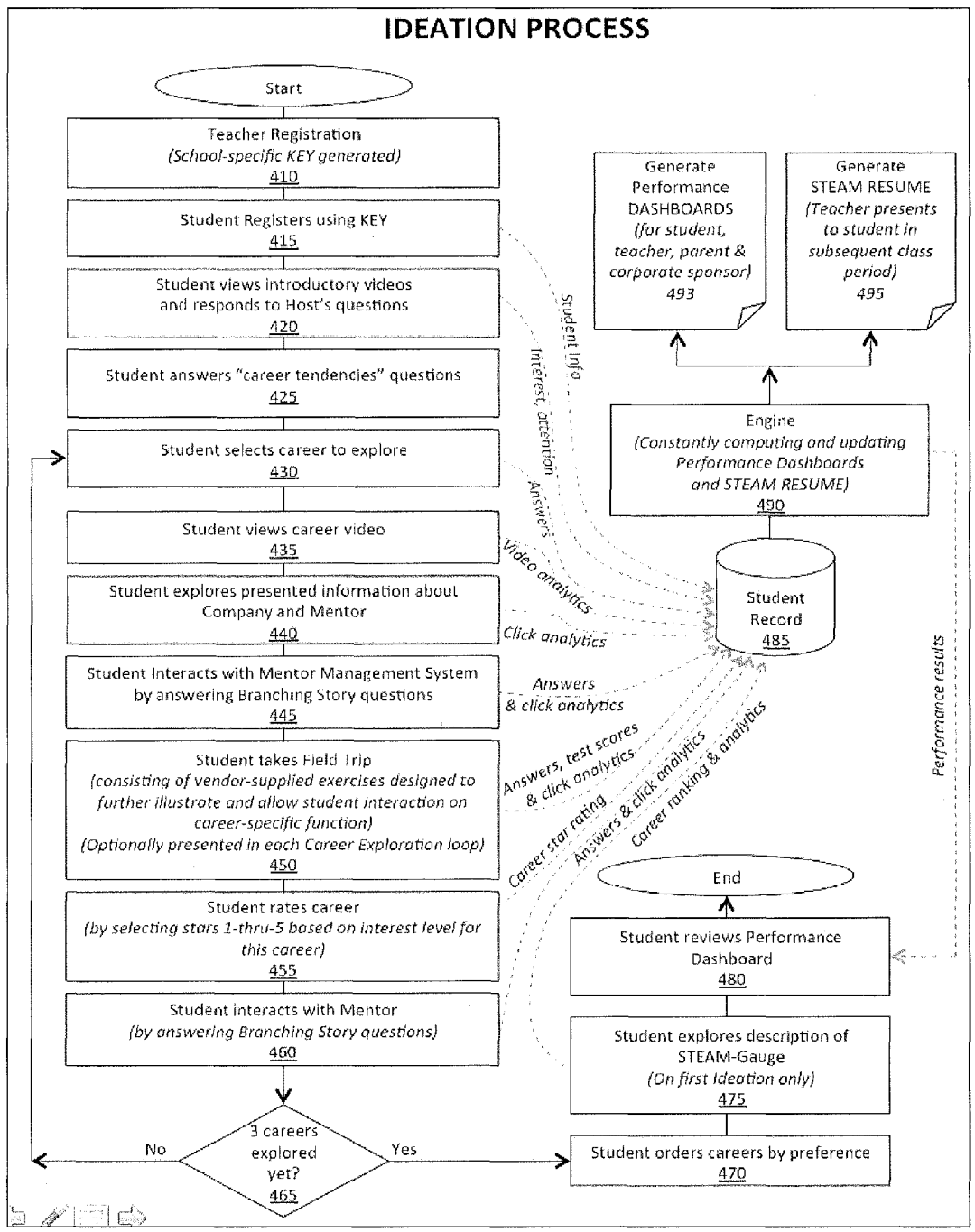
FIG. 4 depicts an exemplary ideation process 400 in accordance with one or more embodiments.

FIG. 4 depicts an exemplary ideation process 400 in accordance with one or more embodiments. In block 410, a teacher may register with the platform and an authorization key may be generated in response to the registration, thus enabling that teacher's students to subsequently register with the platform. The key may be created using a secure random number generation process, thus reducing the likelihood of unintended others being able to register in the platform by guessing at the authorization key. The Ideation process may begin with a teacher/instructor registering with the platform through an interface as being a member of a school/organization that is authorized to be conducting an Ideation Class. The school/organization name may be indicated in a dynamically-populated list of participating entities, and this entity may subsequently sponsor (and/or authorize) students registering in the platform by having students use the key generated in this step. A student may only be able to subsequently experience Ideation through use of a sponsoring school/organization affiliation with the platform.

In block 415, a student may register and/or log into the platform. A student may initially register if not already in the system, and then log into the platform. A form may presented via an interface for the student to enter basic information, e.g. name, address, email address, age, grade, private password selection, and optionally any indications of the student's perceived strengths and possible career desires. This information may be stored in the Student Record.

In block 420, the student may be presented with videos that overview the Ideation process, providing overview, background information, and process instruction. The platform may record various metrics concerning the student's apparent attention and fact retention, e.g., by use of a short Q&A dialog and video processing analytics (duration of the viewing, how many times the video clip was run, start/stop points of the viewing), and saves the results to the Student Record.

In block 425, the student may be next presented with numerous situational settings, and may be requested to select a "would most like" and "would least like" selection for each setting. From these responses, a Career Code may be determined for the student and saved in the Student Record.

In block 430, the student may select one or more careers to explore.

In blocks 435 and 440, the student may then self-select and watch a movie style video trailer that introduces the mentor as the industry role model for the selected career. The platform may record the video processing analytics and saves the results to the Student Record.

In block 445, the student may interact with the mentor. After viewing the career video trailer that introduces and features the mentor for that career, the student may enter into a self-paced Q&A dialog with the mentor, as facilitated by the Mentor Management System. Through this iterative dialog, the mentor may introduce the student to the mentor's day-to-day experiences, use of tools, training and educational requirements, and consideration of various decision-making factors used in performing this job. As a result, the student is able to better understand the operation, requirements, demands, and execution style for this career.

In block 455, the student may provide a career rating. For example, after viewing a career video and going through the interaction with the mentor, the student may be asked to rate the career experience, e.g. on a scale of 1-5. This rating may be saved in the Student Record.

In block 460, the student may interact with the mentor, e.g. by answering Branching Story questions or any other form of interaction.

In block 465, it may be determined if the student has, for example, experienced three careers, and if not the student may select and/or interact with additional careers. After viewing the first Career video trailer, interacting with that career's mentor, and rating the career experience, the student may repeat the career selection and rating of blocks 430 through 460 additional times in order to be exposed to a total of, for example, three careers. The student may be required to select and/or rate a minimum number of careers before being able to continue onto the other steps of the process. The minimum number may be one, two, three, or any other number of careers.

In block 470 and after viewing the career trailers (e.g. after viewing three career trailers), the student may be required to order the careers according to preference. This rating may be saved in the Student Record.

In block 450, the platform may provide one or more virtual field trips to the user and store results of the one or more virtual field trips in the student record. For example, after the student has identified the order of preferred career interest, the student may embark on a Field Trip for that career. The Field Trip (FT) experience may (often) involve the simulated use of a product of the sponsoring company, such as a malware scanning tool, a security workstation, or a network scanner. The simulation may be accomplished, for example, using prepared screen shots and sample scenarios constructed to illustrate an aspect of the technology for the student. Significant student performance metrics may be collected during the FT. The metrics may relate, as constructed and specified in the Data Attribution Table, to the range of skills and degree of importance for this FT, and the tool usage and degree of importance for the FT. The Field trip experience is further described below. Student performance metrics may be saved in the Student Record.

In blocks 475 and/or 480, the student may be provided with a student dashboard and/or STEAM Gauge. After the user embarks on one or more virtual field trips, the student may be presented with several interactive screens that overview the Student Dashboard and/or the STEAM Gauge. The graphical interaction allows the student to see and understand those factors affecting and impacting the performance dimensions based on the skills identified for the selected career. After reviewing the Student Dashboard and/or STEAM Gauge fields, the student may log out of the platform and await the next class period, at which point the teacher/instructor may present and review the detail of the STEM Resume.

In blocks 490 and 495, once the student has completed the Ideation Class, the STEM Resume may be computed. Techniques for creating and examples of the STEM Resume are further discussed below. The report and/or STEM Resume may be made available for viewing and download in the Instructor Dashboard. The instructor may then print and/or review the student's STEM Resume in a follow-on session, focusing on the student's strengths/weaknesses by comparing the STEAM-Gauge to that of the mentor. Further related study, instruction, or Ideation Classes may be planned according to the results presented in the student's STEM Resume.

Figure 21:
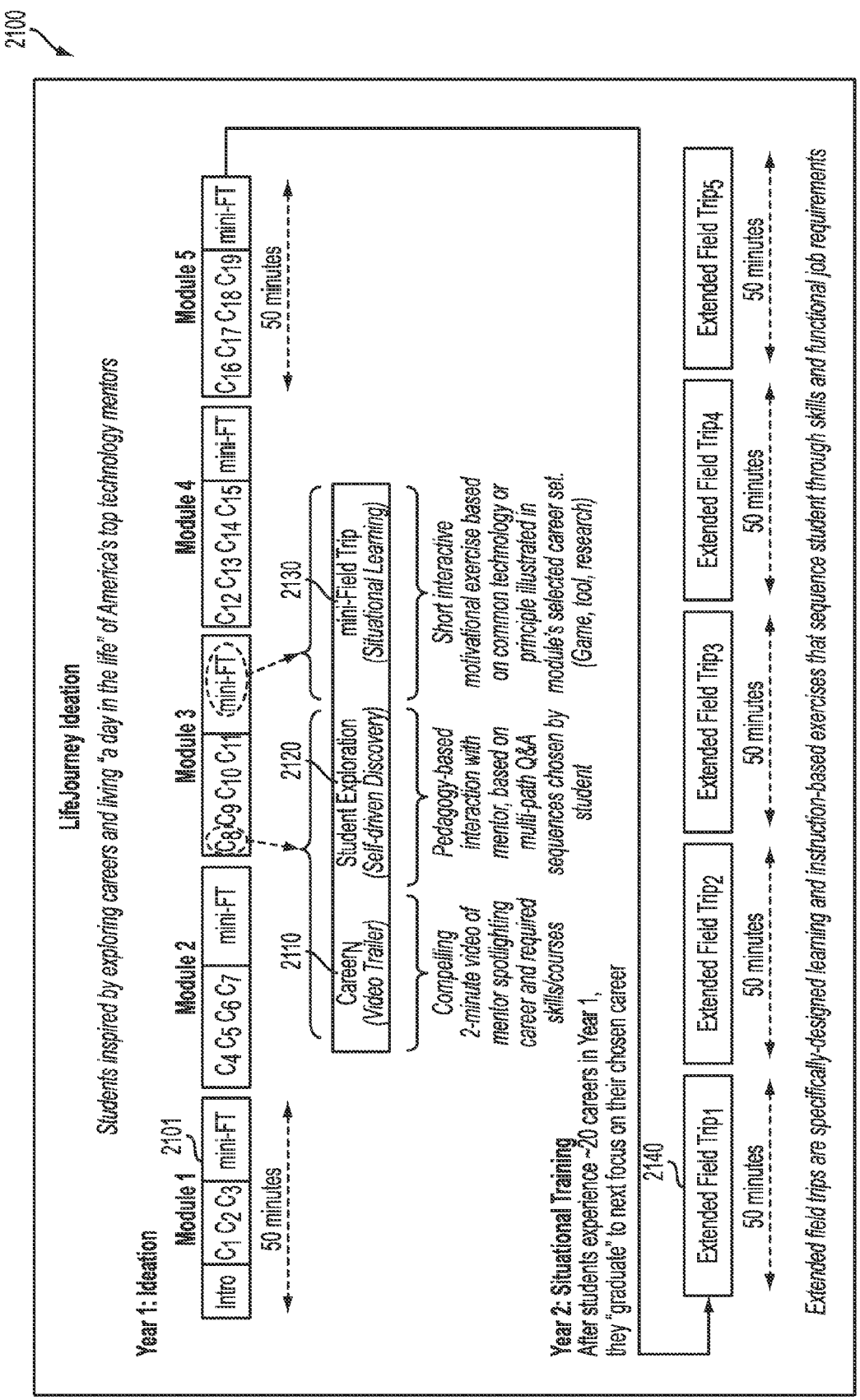
FIG. 21 depicts an exemplary sequence 2100 for implementing ideation in schools in accordance with one or more embodiments.

FIG. 21 depicts exemplary implementation of Ideation in a school. The ideation system is shown a sequence of five Ideation Modules 2101 taken by students over the first year, and a series of Extended Field Trips 2140 that students follow in the second year. Year 2 ultimately leads to possible internships and full-time employment by the companies sponsoring the LifeJourneys selected by the top-performing students. The sequence of Ideation modules and extended field trips is shown, for example, as two-year activity, but they may be spaced out as desired by teacher or school system.

A sequence of Ideation modules may be typically be used throughout the calendar year. This may provide sufficient exposure of twenty new and exciting careers to the students such that they are able to make informed judgments of "favorites." Such a year-long sequence also may provide sufficient pacing for the presentation of concepts, tools and Career Skills for the teacher to incorporate or leverage, as desired, in the existing technology curriculum.

Each Ideation module 2101 may nominally take 50 minutes to complete. The actual duration may be based on the student's interest in the careers presented, and the depth (or thoroughness) to which the student explores the careers. Some students may race to complete the mentor's career questions and finish an Ideation module perhaps within 25 minutes, but most students may explore all possible career questions because of interest.

Each Ideation module allows a student to select and explore three our four careers out of many careers experiences present in the Ideation home page.

Each Ideation module may contain a mini Field Trip experience 2130 provided by a vendor hosting a given module. The Field Trip may provide an interesting exercise focused on a Career Skill that is common across the three careers selected by the student in a given Ideation module.

The first Ideation module 2101 experienced by a student may include some short videos and textual dialog with the Host that overviews the Ideation process and describes the STEAM-Gauge (the basis of interest/aptitude measurement) and the STEM Resume (the student's performance report)

The first module also may include a short Career Tendency quiz, wherein the student indicates preferences about various types of activities presented on the screen. The result helps to form the starting point foundation of the student's career interests, which, over the course of additional career explorations in other Ideation modules, ultimately may be compared to that of the mentor for the career of greatest interest.

The student may explore three careers in this first Ideation module 2101; and with each career, the student will experience pedagogy-based interaction with mentor 2120, based on self-selected, multi-path question-and-answer sequences and situational exercises chosen by student.

Ideation modules after the first one may not repeat the introductory overview and instruction segments, or the Career Tendencies quiz, and therefore may spotlight a fourth career for the student to explore. In this way, since the Ideation Class period may be set at 50 minutes, the students are able to sample an extra career within the same period.

Once students have sufficiently explored different careers in the first year of LifeJourney Ideation, they may graduate to the second phase of taking the in-depth Extended Field Trips 2140. The "mini Field Trip" exercises 2130 done in Ideation Modules during the first year were a short, truncated experience illustrating simple career tools, but these Extended Field Trips are specially-designed learning and instruction-based exercises that sequence student through skills and functional requirements for the specific career chosen by the student. If superior performance is demonstrated here in Year 2, the student may be offered an internship or full-time employment by the company sponsoring that LifeJourney.

In summary, the principles of Ideation Modules operation may include:

Students may get exposed to approximately twenty career experiences in order to have sufficient industry visibility with which to make a meaningful career selection.

Two "Ideation Modules" may reasonably be run by a teacher in Ideation Classes throughout a semester, thus exposing students to 7 or 8 careers in each of the fall, spring and summer school sessions.

Once a class has gone through an Ideation Module, the teacher has multiple options available for working with the students based on their evolving STEM Resume and accruing performances, including individual attention, class focus on a math or science area, or perhaps a group lab project extending one of the mini Field Trips. The teacher may take an opportunity to tie some of the technology principles explored during Ideation to the existing class curriculum, thus leveraging a common foundation of understanding gained by the students through Ideation.

An option that may be available to students to continue and/or finish off the Ideation Modules during the summer, teachers may facilitate special Ideation Classes on Saturdays during an Ideation Summer Camp, or for students to complete on their own, thus providing students an opportunity to continue their career exploration in preparation for the following year's dive into Extended Field Trips 2140.

As the next school year begins in the fall, teachers may get a chance for LifeJourney Curriculum Review in light of the class accomplishments during the preceding year and school system goals for the coming year.

A series of informational and performance-summarizing dashboards and leaderboards may be created during Ideation and are updated and maintained on the fly to give educators and sponsoring companies visibility into the ongoing student metrics collected throughout the school year. Such a dynamic reporting system may provide value for teachers to see aggregate class performance, for principals to see class-to-class success, for superintendents to see achievement across all schools in the district, and for sponsoring corporations to see top performing students, schools and areas of the country.

Figure 5:
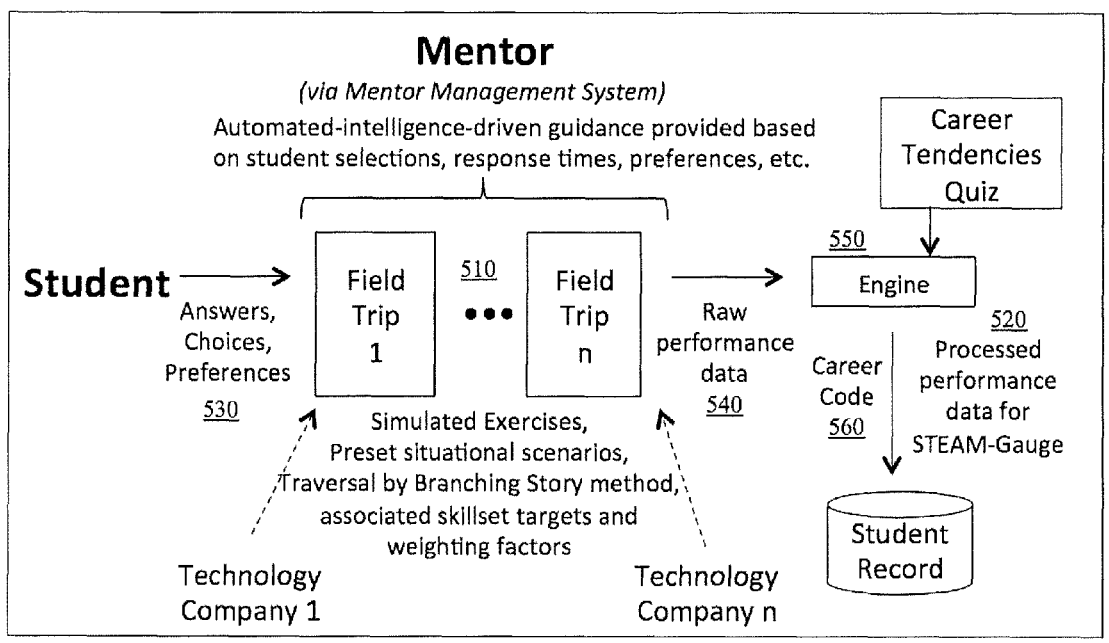
FIG. 5 depicts exemplary field trips in accordance with one or more embodiments.

FIG. 5 depicts exemplary field trips in accordance with one or more embodiments. A Field Trip may be an informative and motivational situational learning exercise that a student follows over the course of a journey. A given journey may be comprised of a sequence of multiple field trips designed to be increasingly meaningful and motivational for that career, its tools, and/or professional responsibilities. While most initial FTs are relatively short in duration, perhaps taking only an hour to complete, an overall journey could take a longer time period to complete, and potentially even lead to an internship or permanent employment with the sponsoring company.

Field Trips 510 may be used to record and assess a student's growth in soft skills (e.g. problem solving, grit, communication), hard skills (e.g. math, science), entrepreneurial skills (business acumen, budgets, presentation), and/or tools (software applications) that are commonly used in the profession.

Field Trips may be grouped, for example, into four levels of increasing complexity and duration. Level 1 Field Trips may be more introductory and overview in nature, thus serving as an easier stepping stone for the student and thus more easily capturing interest. Level 2 and Level 3 Field Trips may encompass more specifically targeted activities relating to the job being explored. Level 4 Field Trips are the culmination of the exposure a student would receive for the specific career, resulting is farther-reaching and more impactful capstone-like projects for the company sponsoring the journey. In fact, the Level 4 Field Trip could well complete with the student gaining an internship or even permanent employment with the company.

Information about the Field Trips may be stored in the platform. For example, specific skillsets for the job and/or career may be assigned weights according to importance for each FT. Skillset weights may be stored in the Data Attribution Table (DAT). FTs may be selected and constructed to test career skills. FT complexity and/or comprehensiveness levels (1-4) and max scoring may also be placed into DAT for use by Engine.

Field Trips may be custom-developed by the company, or may be selected from a Field Trip Catalog of "standard building blocks," such as tutorials made by tools and applications vendors (e.g., AutoDesk® or Microsoft®), games that teach principles of core technology and human interaction, or educational simulations that cultivate skill growth in the core STEM areas.

Field trips may be the way the mentor (and hence the sponsoring company for the career) enables the student to experience what it is like "to live a day in the life of" the mentor, and thus understand the career and the skills required for it. Situational learning constructs may (often) be used as the pedagogical basis of the scenarios prepared and presented to the student to use when exercising, exemplifying or illustrating a skill, tool or educational principle.

Field Trips may be presented for each career in the same initial way for each student. However the FT may change based on how the student selects paths or answers questions 530 throughout the FT experience, much as done with certain types of role-based games. The FT may change according to a branching story associated with the field trip.

Information collected about the student during a Field Trip may include the situational path sections and answers (right or wrong, quantitative, qualitative), time/duration, likes/dislikes, and more. This information may be used in determining the student performance, as represented on the Student Dashboard and the student's STEM Resume.

The data collected throughout the field trip experiences, e.g. raw performance data 540, may be used to determine the student's relative performance, aptitude, situational decision-making and interest level for the given career, as compared to that of the Mentor, and as defined in the skillset targets in the Mentor Knowledge Base, and represented in the Mentor's STEAM-Gauge. The student data may be processed 520 and represented as performance charts in the Student Dashboard and the Student STEAM-Gauge in the STEM Resume.

Although most field trips are typically contained within chosen career journeys, general field trips unassociated with chosen career journeys may also be provided to users. For example, the general purpose field trip "set up your office" may be provided to a student, from which measurements can be taken to determine how the student performs.

Badges may be periodically awarded to students, based on performance or successful student responses, to inspire and motivate student progress. These badges may become the authenticating mechanism that attests to a student's achievements when used in other settings, such as resumes, social media home pages, etc.

JourneyPoints may be issued to recognize granular individual achievements as a student progresses through field trips, and may be incrementally used in other motivational ways, such as to obtain discounts at local stores, etc.

Figure 6:
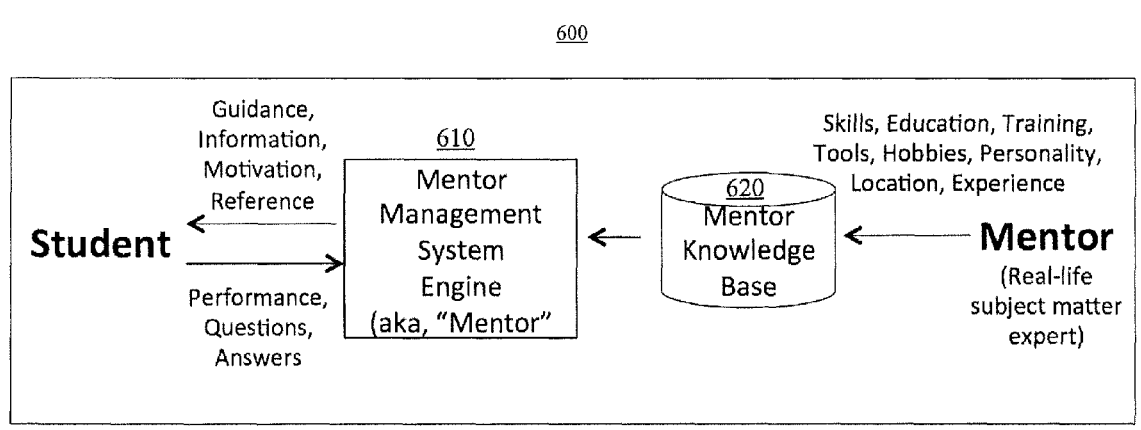
FIG. 6 depicts an exemplary mentor management system 600 in accordance with one or more embodiments.

FIG. 6 depicts an exemplary mentor management system 600 in accordance with one or more embodiments. Mentor management system 600 may be an automated intelligence expert knowledge base mechanism that: 1) Initially collects characterizing data about the mentor and places it into a knowledge base in order for later automated interaction with students; 2) Dynamically presents information, poses questions, and prompts for specific student responses in accordance with a branching story; 3) Delivers guidance, encouragement and information to the student in form of message content consistent with the journey in progress, as prepared in advanced by the subject matter expert of the corporate sponsor for that journey; and 4) Facilitates collection of the student performance data and provides the data to the engine for processing and decision making.

A Branching Story may be a script describing a situational learning scenario that provides the mentor management system 600 with guidance for presenting information, posing questions, and prompting for specific student responses. The branching story may include a specific order for presenting content, a specific order for presenting content based on responses received or other metrics collected, and/or instructions for presenting content that enable the mentor management system 600 to exercise some degree of control over the content provided.

Mentorship offered by the platform may differ notably from approaches typically followed for mentoring students in education systems over the years. Traditional mentorship is bound by the physical limitations of time, physical presence, and qualifications of the mentor—and thus only a handful of students may benefit from mentoring guidance of an expert or educator. Further, from a career direction standpoint, a traditional mentor is often not best suited to address and provide guidance for the wide variety of technology career opportunities available to today's students. These cyber- and STEM-related jobs are the ones the U.S. critically needs to fill in order to maintain a leading role in the world economy.

In contrast, the Mentor 610 (i.e., the "virtual mentor") provided by the platform serves as a unique and powerful new STEM-motivational mechanism. It is a massively scalable mentoring platform that enables millions of students to be guided, and their core skills assessed. Mentor management system 600 is able to identify true career passions of the students, open their minds to a multitude of tangible career possibilities, and open their futures to the technology workplace of America. Simultaneously, the mentor management system enables the platform to provide a rich, bountiful and discovery-oriented thrill to career exploration.

The Mentor may be a virtual representation of the actual, physical mentor at the company that developed the specific journey, and may be manifested by the platform's internal mentor management system.

The mentor management system enables the Mentor of each company-sponsored journey to reach, influence, guide and motivate millions of students. Because the platform uniquely provides massively scalable mentoring, the mentor management system enables each Mentor to represent the expertise, product, company and career being featured in the journey. Because of the mentor management system, a single Mentor is able to be offered to, inform, and inspire an entire generation of students.

The mentor management system may comprise an expert knowledge base system (e.g. one that self-evolves and becomes more comprehensive and accurate over time) that embodies a rich characterization of the real-life mentor's skills, training, background, motivational dimensions, workplace style, problem solving approaches, and/or many other factors that make the physical mentor the valuable expert that he or she is.

The mentor management system may provide guidance, encouragement, metric assessment and collection, and interactive dialog with the student based on the content of the Mentor Knowledge Base—a database of information about the mentor's skills, capabilities, day-to-day activities, and more.

The skills may be any skills, e.g., those typically required of, or possessed by, a person in the specific subject career. The profile can be represented by a multi-colored "radar plot" graphic that illustrates vectors of differing magnitudes in directions of Science Technology, Engineering, Arts and Math. These profile vectors are assigned during the initial interviews with the actual mentors when establishing and populating the Mentor Knowledge Base 620.

The Mentor Knowledge Base 620 is a collection of various information automatically collected by the Wizard during the initial establishment of the journey, and used by the Mentor Management System throughout the student's exploration of the journey. The Mentor Knowledge Base includes information specific to the actual subject matter expert selected by the sponsoring company to be represented as the Mentor in the Mentor Management System; information such as education, training, tools, hobbies, personality, location, career experience, and other information found to be related to the specific career journey being constructed. Importantly, the Mentor Knowledge Base also enumerates the specific skills and education credentials necessary for performing this career role, as identified by the Mentor and external career reference resources (e.g., skill and education requirement databases). The Mentor Knowledge Base also contains the branching story developed in the Wizard, representing the sequence of pedagogical questioning and information presentation designed to allow student self-guided exploration.

The mentor management system may begin interacting with a student once the specific career video trailer has been initiated and may interact continuously, 24×7, with all students who are interacting in a specific-career journey.

A wide array of techniques are employed by the mentor management system to "connect" with a student: text, email, and artificial intelligence-like electronic dialogue that can sense a student's mood, disposition, sense of accomplishment or even degree of interest—all which may be useful to help the sponsoring company's Mentor, as implemented by the mentor management system, to make a point, provide guidance, point to background reference material, and make course corrections when necessary. From a sheer performance perspective alone, the mentor management system enables the platform to far exceed the limited-bandwidth capabilities of the classic one-on-one mentoring model.

A key factor that enables the platform to be an effective agent for capturing student interest and satisfying thirst for exploring technology futures is the range of techniques used in the Field Trips to actually engage the students. When the student is actively involved in a topic thread, the mentor management system may administer numerous methods for engaging the student, such as text and email communications, interaction via the web browser, point illustration using an interactive online games, "scavenger hunt" activities that the student physically follows and reports progress online, mentor-guided exploration of principles and practices that otherwise would be physically unachievable (e.g., searching for sunken treasure at 2,000 feet below sea level), or any combination thereof.

Figure 7:
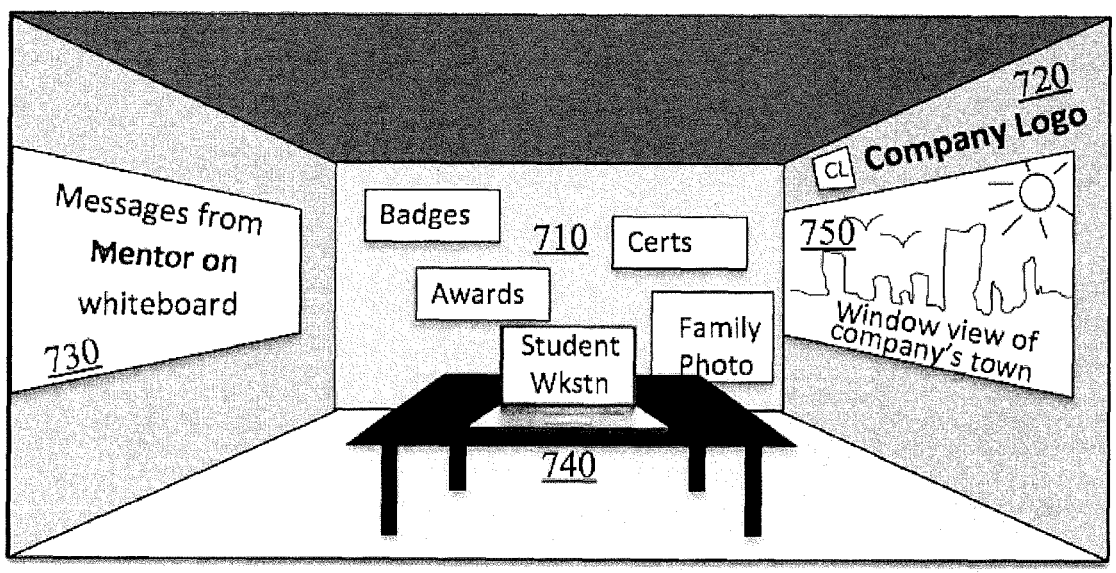
FIG. 7 depicts and exemplary virtual office 700 in accordance with one or more embodiments.

FIG. 7 depicts and exemplary virtual office 700 in accordance with one or more embodiments. The virtual office may be the primary interaction point that the student has with the platform. The Virtual Office may represent a typical office of the sponsoring company where the Mentor is employed.

The Virtual Office may be used as a the "home" location for a student when taking a given career/company's journey, whereby the office decor and artifacts contained within are a reflection of the student's Ideation, career exploration and Field Trip experiences, e.g. a window view of the company's town 750. The system automatically places awards, certificates, JourneyPoint indicators and other achievements earned while the student is progressing through the journeys. For example, if a student performs exceptionally well during a Field Trip concerning network routers, a graphic of the journey-sponsoring company's network router may appear in the student's Virtual Office. The student then has the facility, if desired to arrange the objects in the Virtual Office to his liking—such as on the walls or tables—and even import local graphics that may represent family photos or other objects.

The virtual office may comprise whiteboard messages 730. Whiteboard messages may comprise instructive messages, such as initial instructive messages, that the mentor management system delivers to the student. For example, the whiteboard, which may be a dedicated space on the office wall containing short messages written by the Mentor (i.e., the mentor management system), that provides instructional messages to direct the student to start on a more in-depth exercise.

Virtual Office 700 may comprise computer workstation 740 (Monitor). The student may provide input to the platform at the computer workstation 740 in the Virtual Office, and the mentor management system (aka the Mentor) may communicate with the student by sending messages to the computer monitor 740. When the student clicks on the computer monitor 740 to begin the experience, the screen may expand to full screen in order to present the simulated environment for the student to interact with (e.g., view slides/screen images, videos, and interact with dialog presented by the mentoring subsystem. For example, when the student clicks on the monitor, it expands to full screen and allows normal text-based and graphical interaction with the student. Student keyboard input may be made at the computer workstation by typing on the student's physical keyboard (or otherwise text entry on a mobile platform), and may be reflected on the virtual screen of the computer monitor.

Graphics, videos and text are all displayed by the Mentor (mentor management system) on the virtual computer workstation screen when expanded to full-size on the student's physical computing platform.

The Virtual Office may comprise various virtual artifacts, depicted as objects on the desk, wall and floor, that represent the student's current exercises or accomplishments (achievement awards, certificates, etc.) collected previously in the experience.

The virtual office may comprise company branding. Corporate logos and other company-specific artifacts 720 on the walls that brand the Virtual Office as being similar to an office of the company sponsoring the journey.

The virtual office may comprise one or more Field Trip Objects 710 which may be various objects placed in the office relating to specific field trip exercises and which may be selectable by the student for further study (expanded view, discovery of further information contained within, etc.).

The virtual office may comprise one or more Badges, Awards, and/or Certifications 710. One or more virtual office walls may include an ever-growing number of award objects signifying student achievement throughout the journey experience.

Figure 8:
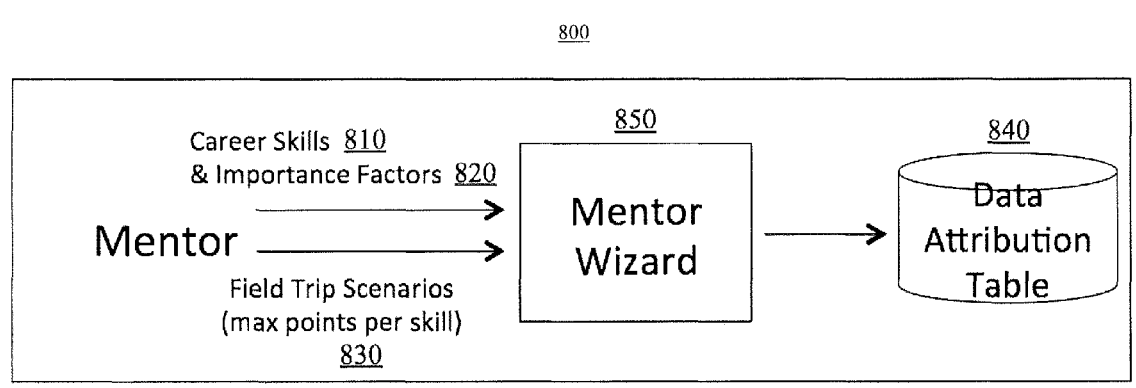
FIG. 8 depicts an exemplary interactions 800 with a wizard in accordance with one or more embodiments.

FIG. 8 depicts an exemplary interaction 800 with a wizard in accordance with one or more embodiments. The genesis of a new career may begin with entry of the specific skills 810 and importance indicators 820 for those skills, and the Field Trip scenarios 830 that the student may experience and be measured upon relative to those skills. The result (output) of the Wizard is the initialized Data Attribution Table 840, which is the primary data repository for the subject career and student performance metrics.

The Wizard may be the module that creates the initial instance of the Data Attribution Table (DAT) 840 for a given career. It may provide the interfaces for the Mentor to set up a journey for the career journey being created. The Wizard may prompt and accept input from the Mentor relative to two main types of information: Career skill and field trip value assignments.

A career may be characterized as having a set of skills ideally possessed by a subject matter expert (i.e., the Mentor) performing that career role. Any number of skills, e.g., more than 100 possible skills, may be described and used within the platform to assess a student's performance in that career role.

The skills may be grouped into four major categories:
1. Hard Skills—such as algebra, trigonometry, calculus, physical science, particle physics, reading, writing, written comprehension, et al;
2. Soft Skills—such as interpersonal relationships, communications, verbal expression, teamwork, flexibility, time management, work ethics, et al;
3. Entrepreneurial Skills—such as passion, energy, multitasking, customer concern, money management, et al; and
4. Tools—such as Excel, Word, data mining, visualization, scanners, Photoshop, WordPress, FrontPage, MS project, OmniPlan, AutoCAD, et al.

The developer, such as a mentor represented by the Mentor, may first consider the full list of skills used by the platform and selectively remove those not applicable for the subject career. The skills remaining represent to full set of skills believed by the Mentor to be representative of his/her skills as a subject matter expert in this field.

The developer may then assign an importance factor (1-100%) for each remaining skill indicating the relative importance of each when performing the subject career role.

The developer may construct a series of Field Trips designed to test the composite set of skills required in the subject career. As discussed above, Field Trips may be scenarios and role-playing exercises such that the skills for the subject career have an opportunity to be used, and hence measured, when the student is running the field trip experience. The developer may assign a maximum points able to be achieved for each exercise in the Field Trip. During product operation, the Engine may uses the Max Points value with Skill Importance to compute the sub-score for the exercise.

Figure 9:
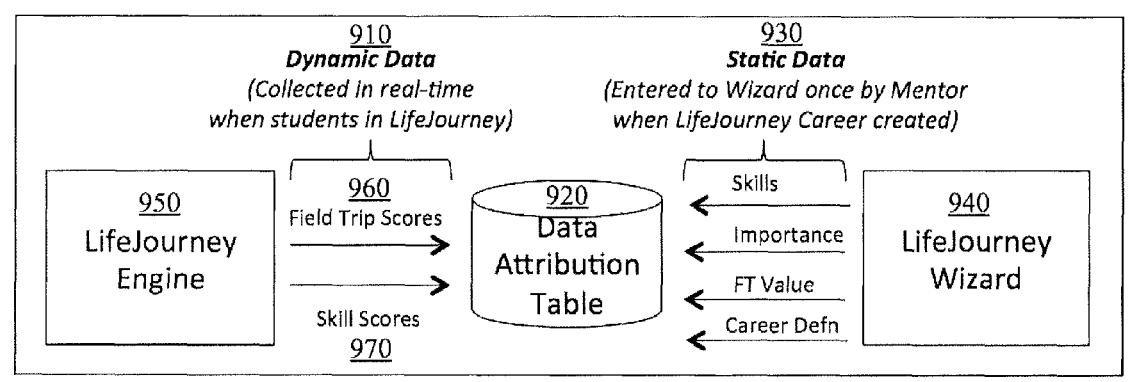
FIG. 9 depicts interactions 900 with an exemplary data attribution table in accordance with one or more embodiments.

FIG. 9 depicts interactions 900 with an exemplary data attribution table in accordance with one or more embodiments. The Data Attribution Table 920 (DAT) may be the primary repository and/or data structure for definition of a career and for student performance metrics. For example, data attribution table 920 may store a career and its attributes, e.g. skills, importance factors and field trip grading framework, and the student's performance metrics for those attributes.

Static data 930 may be stored in and/or received from data attribution table 920 by the wizard 940. This data may include, for example, skills, importance values, FT values, or any other information supplied by the engine. Static data 930 may include entered infrequently, e.g. once, by a developer when a career is created. Static data 930 may include one or more career definitions.

A Career Definition may be provided by Wizard 940. A given career may be defined by certain static data entered at journey creation time, and which may usually remain unchanged, as quantified and entered to the DAT by the Wizard or Mentor when using the Wizard 940. The data may include skills possessed by a subject matter expert (e.g. the Mentor); importance factors for each of those individual skills; and/or Field Trip value assignment (max points achievable for a given FT exercise).

Dynamic data 910, such as student performance metrics, may be stored in and/or received from data attribution table 920 by the engine 950. This data may include, for example, field trip scores, skill scores, or any other information supplied by the engine. Dynamic data 910 may include information collected in real-time when students are in a journey. For example, when the student is experiencing a Field Trip, dynamic data may be measured by the Field Trip module, computed into a FT Score 960 and Skill Score 970 by the Engine 950, and the scores may be deposited in the DAT 920.

FIG. 10 depicts an exemplary data attribution table 1000 in accordance with one or more embodiments. DAT 1000 may include one or more skills 1010, one or more overall skills 1020 one or more field trips 1030-1 to 1030-*n* having one or more tests 1040 and one or more max scores 1050 weights 1060, one or more JourneyPoints 1070, one or more grades 1080 and one or more levels 1090. DAT 1000 may be stored in data cloud 135, local data cloud storage 155, or any combination thereof The one or more skills 1010 may include all the skills tracked and/or measured by the platform. The one or more overall skills 1020 may indicate the relevant skills for a particular career, e.g. a Data Scientists. For example, the relevant skills are illustrated in FIG. 10 with an 'X'. The one or more field trips 1030-1 to 1030-*n* may each include one or more tests 1040 and one or more max scores 1050 for the tests and one or more scores 1045. Weights 1060 may be entered, set, or stored for each skill, e.g. as indicated in the row for each skill with an 'X'. The one or more JourneyPoints 1070 and/or the one or more grades 1080 may be computed by the Engine. The one or more field trips 1030-1 to 1030-*n* may be organized into one or more levels 1090. Although only one level is shown in FIG. 10, it is to be understood that many levels of field trips, e.g. Levels 1-4, may be possible. For example, the field trips may be organized into Level 1 Field Trips (e.g., Introduction & Tools Overview), Level 2 Field Trips, Level 3 Field Trips, and Level 4 Field Trips.

Information for the DAT 1000 may be entered using, for example, a DAT Worksheet, which may be used by the Mentor and/or the Wizard to construct the sequence of Field Trips that the student takes in following the journey. Measurement criteria may be established to determine performance. This may be a one-time setup needed before a student can begin the journey. The following steps may be performed in order to setup the DAT Worksheet.

STEP 1: Identify Skills—Using the master (overall) DAT, select those skills that are applicable for this journey. Put an X into column D and remove all other unnecessary skill rows. And feel free to add additional unique skills that are deemed important for this journey.

STEP 2: FT Construction—Determine the FTs needed for each level and identify them at the top of the major FT columns (e.g. E-H, I-L, etc.)

STEP 3: FT Tests—Within each FT, determine the test(s) students will take, and correspondingly the measurements to be collected. These may be entered in row 4 for each FT.

STEP 4: Max Score—For each FT test, identify the Max score achievable for a given test and place it into row 5. Thus, the actual Score achieved for the test (placed in row 6 during the journey execution) can have this value at most, and is compared to the Max to determine the FT Grade. The Score may also become the Journey Points achieved for the FT, so select the Max value with attention to value and complexity of the FT. For example, easier FTs in the earlier FTs of a journey may generally have lower values than the Max values of more complex FTs downstream.

STEP 5: Skill Weightings—For each FT, identify the Weight, such as a percent, of each skill that is applicable for that FT. Only a few skills will be exercised within a given FT. The result may be a constellation of populated Weight cells. The Weight x Grade determines the Performance demonstrated for that skill in a given FT.

Although depicted in FIG. 10 as a spreadsheet, data attribution table may be stored in any format for storing data. Similarly, data entry may be performed using any technique for data entry, e.g. web pages, API calls, or any other techniques.

Skills may include, but are not limited to, any of the following:

| | | |
|---|---|---|
| Hard Skills | Math | Algebra |
| | | Geometry |
| | | Calculus |
| | | Trigonometry |
| | | Statistics |
| | Physics | Bio |
| | | Physical |
| | | Astro |
| | | Mechanical |
| | | Quantum |
| | | Theoretical |
| | | Experimental/Applied |
| | | Particle |
| | | Nuclear |
| | Chemistry | Analytical |
| | | Quantum |
| | | Physical |
| | | Nuclear |
| | | Clinical |
| | Accounting | Audit |
| | | Tax |
| | | Management |
| | | Financial |
| | | Budget Analysis |
| | Computer | Windows |
| | | Linux |
| | | Cyber Security |
| | | Network Technology |
| | | Repair |
| | | Design |
| | | Parallel Computing |
| | | Massive Computing |
| | | Big Data Computing |
| | | Embedded Computing |
| | | Computer Science |
| | | iOS |
| | Programming | J2EE |
| | | C |
| | | C++ |
| | | C# |
| | | HTML |
| | | CSS |
| | | PHP |
| | | Perl |
| | | Ruby |
| | | Visual Basic |
| | | Assembly |
| | | Java |
| | | JavaScript |
| | | .NET |
| | | Python |
| Soft Skills | Communication | Verbal |
| | | Written |
| | | Body |
| | | Good Listener |
| | | Assesses without judgment |
| | | Build Bridges w/Others |
| | | Effective Share Feelings |
| | | Accepts Feedback |
| | | Open Minded |
| | Relationships | Respect |
| | | Empathy |
| | | Warmth |
| | | Genuine |
| | | Self-Disclosure |
| | | Confrontation |
| | | Immediate Feedback |
| | | Genuine |
| | | Concreteness |
| | Leadership | Integrity |
| | | Dedication |
| | | Magnanimity |
| | | Openness |
| | | Creativity |
| | | Fairness |
| | | Assertiveness |
| | | Sense of Humor |
| | Organizing | Goal Setting |
| | | Makes Lists |
| | | Time Manager |
| | | Keeps Calendar |
| | | Prioritizes Jobs |
| | | Creates Routines |
| | | Reduce Clutter, Confusion |
| | Problem Solving | Resourcefulness |
| | | Optimistic |
| | | Accept ownership |
| | | Vocalize |
| | | Accuracy |
| | | Systematic Approach |
| | | Computational |
| | Grit | Focused |
| | | Self Confident |
| | | Resilient |
| | | Passion |
| | | Perseverant |
| | | Diligent |
| | | Optimistic |
| | | Hard Worker |
| | Time Management | Prioritize Tasks |
| | | Seek Advice & Delegate |
| | | Knows When To Say No/Help |
| | | Multitask |
| | | Use Time Wisely |
| | | Deadline Driven |
| | | Has a Plan B |

-continued

| | | |
|---|---|---|
| | Teamwork | Positive Group Interaction |
| | | Leadership |
| | | Cooperative |
| | Work Ethic | Motivated |
| | | Dedicated |
| | | Conscientious |
| | | Productive |
| | | Reliable |
| | | Character |
| Entrepreneurial | | Public Speaker |
| | | Passion |
| | | Team Player |
| | | Improvement Oriented |
| | | Manage Money Wisely |
| | | Asks For The Sale |
| | | Multitasking |
| | | Results Oriented |
| | | Energy |
| | | Risk Taker |
| | | Customer Concern |
| Tools | Big Data | Data Mining |
| | | Data Analysis |
| | | Excel |
| | | Hadoop |
| | | Luence |
| | | Google (Search) |
| | | Geo Xray |
| | | Oracle |
| | Cyber Security | IDA Pro |
| | | DETER |
| | | CSET |
| | | EnCase |
| | | Ghost |
| | | DataGrab |
| | | AntiVirus |
| | | Firewall |
| | | Ethereal |
| | | Host Anomaly Detection |
| | | Clearable |
| | Network | Visualization |
| | | Ethereal |
| | | Pass crackers |
| | | Sniffers |
| | | Vulnerability Scanners |
| | | Web scanners |
| | | Wireless |
| | | Exploitation |
| | | Packet crafters |
| | | IDS/IDP |
| | | Firewalls |
| | Programming | Visual Studio |
| | | C |
| | | Java |
| | | C++ |
| | | C# |
| | | Perl |
| | | Codecademy |
| | | Ruby |
| | | Visual Basic |
| | | Assembly |
| | | Python |
| | Artistic Design | Photoshop |
| | | Corel Suite |
| | | Flash |
| | | Fireworks |
| | Architectural | AutoSketch |
| | | AutoCAD |
| | | My House |
| | Project Management | MS Project |
| | | Base Camp |
| | | OmniPlan |
| | Web | FrontPage |
| | | Dreamweaver |
| | | WordPress |
| | | BrowserStack |
| | | WebMatrix |
| | | WebStudio |
| | | PHP Designer |
| | | Flash Studio |
| | Social | Facebook |
| | | Email |
| | | Text |
| | Cyber Forensics | EnCase |
| | | Ghost |
| | | DataGrab |
| | Other Apps | MS PowerPoint |
| | | MS Visio |
| | | Smart Draw |
| | | MS Visio |
| | | MS PowerPoint |
| | Social | Text |
| | | Facebook |
| | | Email |

Field trips may include, but not be limited to, any of the following: FT #1: Meet The Mentor, FT #2: Setup Office, FT #3: Clearable, FT #4: What Is Big Data?, FT #5: Pitcher Stats, FT #6: Choosing the Right Tool, FT #7: Data Sizing, FT #8: Algorithms in Data Mining, FT #9: Efficiencies in Algorithms, FT #10: Situational Data, FT #11: Working With Hadoop, FT #12: Enterprise Applications, FT #13: Data Transformations, FT #14: Assembling Data, FT #15: Drawing Conclusions, or FT #16: Presenting Results.

The Engine 550 may be the module that that computes student performance (e.g. Scores, JourneyPoints, Grades, etc.), Career Codes 560, the STEAM-Gauge, and/or other indicators of student achievement that ultimately get reported in the dashboards and Resume. The Engine may operate on data contained in the Data Attribution Table (DAT), which may be the primary data repository for the subject career.

The Engine 550 may perform computations for determining career tendencies by generating a Career Code 560. A exemplary approach to generating a Career Code may be the Holland Code (http://en.wikipedia.org/wiki/Holland_Codes), whereby the student's career interests may be initially determined at the start of the Ideation experience, and may be based on the student's answers to the interactive questioning establishing personality type. Research suggests that "personalities seek out and flourish in career environments they fit and that jobs and career environments are classifiable by the personalities that flourish in them." Thus, the Career Code determined for a student may be used to bias the internal factor tables for the appropriate element when computing the student's STEAM-Gauge.

Students may be presented with nine questions in the Career Tendencies Quiz, and the answers may be used to generate the student's Career Code. Four responses may be collected for each question. Each of the responses in a single question may represent four of the six personality types: Investigative, Realistic, Artistic, Enterprising, Social, and Conventional. A total of six responses may be collected for each personality type spread across the nine questions. There may be a total of thirty-six responses for the nine questions.

Students may select the Most Preferred and Least Preferred response options. The Engine may sum the Most Preferred responses and the responses that are Not Selected to calculate the student's Career Code. The Career Code may be generated by summing the Most Preferred responses for each personality type and dividing that sum by nine. For example, if the total number of Most Preferred responses is 4, 4 is then divided by 9 to yield 44%. Similarly, the responses that are Not Selected may be summed and divided by eighteen. For example, if that number is 2, we divide 2 by 18, which yields 11%.

The Engine may then add the Most Preferred percentage with the not selected percentage, and then divides that number by 2 to generate the Career Code for each personality type. For example, 44%+11%=55%. 55% divided by 2 equals 28%. The 28% represents the Career Code for that personality type, for example, Investigative. This computation may be performed for each of the six personality types.

This method may be used to minimize the occurrence of zero percentages due to the limited number of questions being asked. There is still the possibility of generating zero percent for a given personality type, but by using this approach, the zero percent condition is minimized.

The engine may perform computations for determining Field Trip Performance, such as those calculations discussed with respect to DAT 1000. For example, a test score may be delivered to the DAT and Engine by the FT module and stored in the Score field. A preliminary Grade may be computed for each test. For example, preliminary grade=Score/Max Score. The preliminary Grades for each test within a FT may be averaged to form the FT Grade and stored in the Grade field. The Journey Points may be computed as the sum of the Score for each test within the FT and stored as Journey Points. The Performance for each Skill row may be computed as the Grade x Weight for that Skill and stored as Performance. The results of the Engine may indicate a Performance for each Skill within each FT.

The Engine may perform computations for presentation on a Student Dashboard.

The Engine may compute overall performance for each skill as the average of all performances on a Skill-by-Skill basis, such as:

Average Performance for each Skill=$\Sigma_0^n$(Performance (FT$_n$))/n, wherein FT is the field trip, FT$_n$ is a skill n performed in fieldtrip FT, and n is the total number of skills.

The Engine may compute a Normalized Performance for each Skill, such as:

Normalized Performance of a Skill=Performance (Skill)/Max Performance (of all Skills)×100.

The results may be displayed as a number (e.g., as a list) or graphic (e.g., bar, pie, etc.) depicting all Skill Performances as percentage of the Skill with the maximum performance. For example, FIGS. 11A-11C depict exemplary student dashboard calculations in accordance with one or more embodiments. The student's normalized Skillset Assessment performance is enumerated on a skill-by-skill basis, based on the cumulative degree of achievement demonstrated in the Field Trips for the journey; and the Accomplishment Summary enumerates the Field Trip performances for the journey, resulting in the overall score and Journey Points achieved by the student in the journey.

Figure 12:
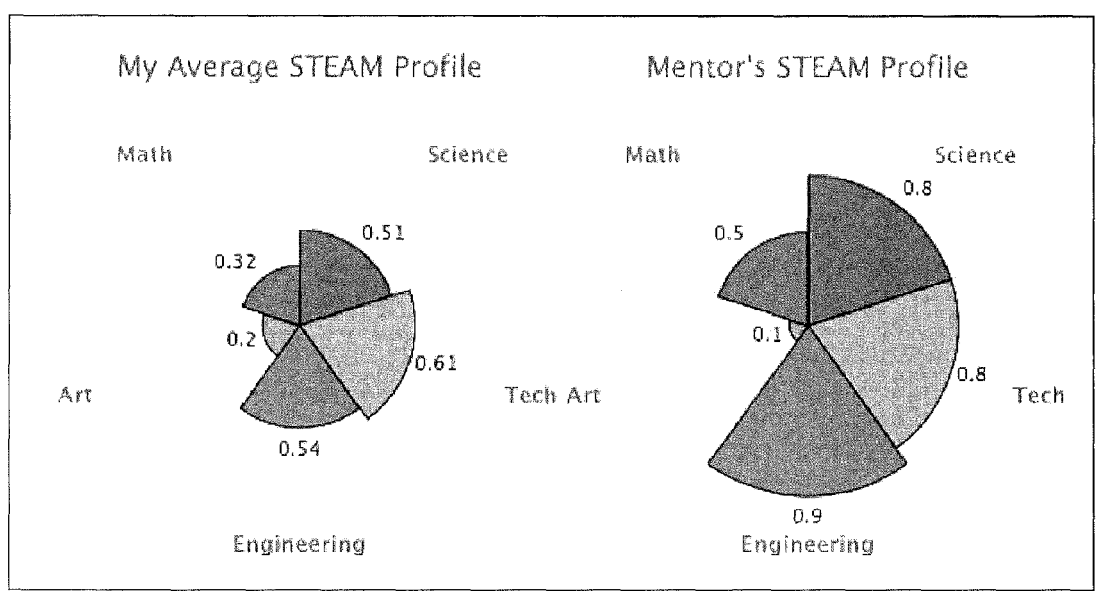
FIG. 12 depicts exemplary STEAM-Gauge profiles in accordance with one or more embodiments.

FIG. 12 depicts exemplary STEAM-Gauge profiles in accordance with one or more embodiments. The STEAM-Gauge may be a representation of the student's and/or mentor's skills and capabilities across multiple dimensions considered by leading educators to be a significant measure of an individual's aptitude and tendencies in technical fields.

The STEAM-Gauge algorithm may consider: hard skills (e.g. chemistry, physics, etc.), soft skills (e.g. communication, writing, team interaction, etc.), and entrepreneurial skills (e.g. business planning, marketing, etc.) based on dimensions of Science, Technology, Engineering, Arts, and Math. These skills may be those typically called out in a Job Specification for the career, as specified by the HR departments of the hiring companies. These skills may be rated on a scale, for example a scale from 0-10 (typically), with the more important skills for a given job being assigned higher numbers.

The values for factors involved in the STEAM-Gauge algorithm may be obtained through the user's responses to questions of preferences, situational choices, and from situational reaction choices.

Figure 13:
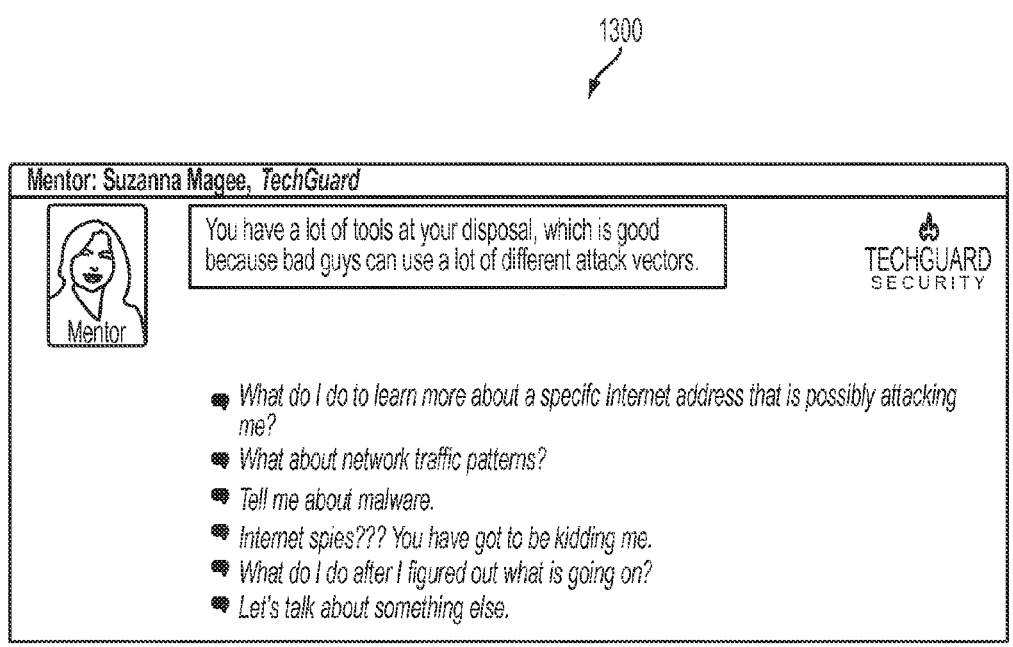
FIGS. 13 and 14 depict exemplary interfaces for student interaction in accordance with one or more embodiments.
Figure 14:
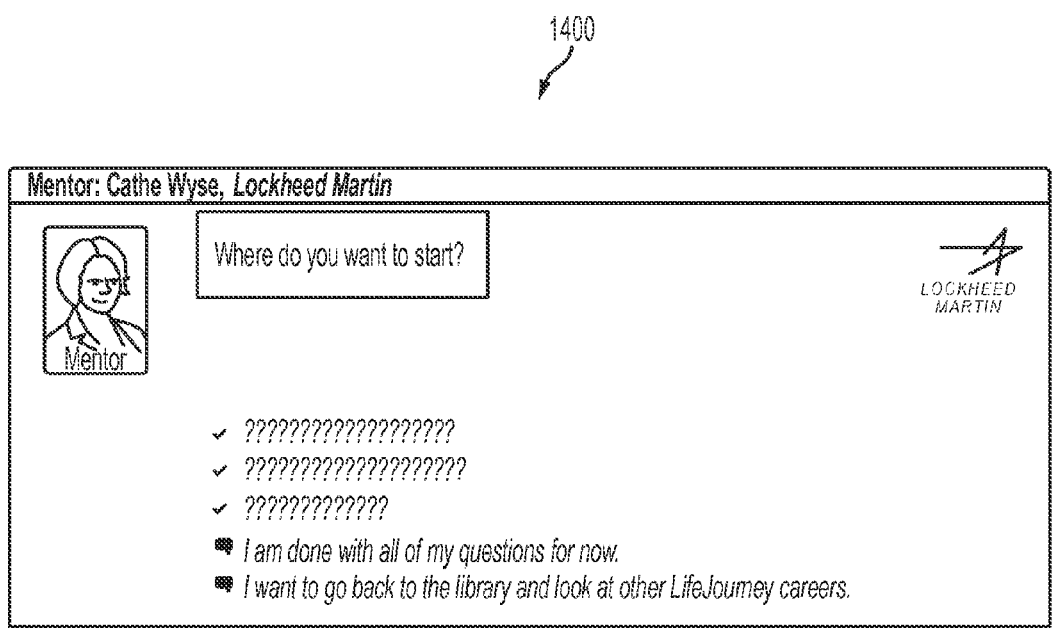

As a user moves through the various screens/application windows, questions may become more specific or pointed based on how long the student has been following a given thread. That is, additional specificity is collected with continued questioning and/or responses. FIGS. 13 and 14 depict several examples of this interaction. The student may be given the opportunity to continue asking questions in a given line of explanations, thereby self-guiding himself/herself to a deeper level of understanding of the topic.

The STEAM-Gauge algorithm may utilize a combination of arithmetic, statistical and artificial intelligence techniques to assess and report student performance. The student performance is computed and then reported as a multi-colored pie chart-like graphic representing his/her strength vectors in the five constituent elements: Science, Technology, Engineering, Arts and Math.

The STEAM-Gauge algorithm first considers the Mentor's STEAM-Gauge as a collection of numeric values ranging from 1-to-10 (as well as a correspondingly-sized multi-dimensioned graphic) representing the value or importance of each of the elements S, T, E, A and M for a given career. The Student's STEAM-Gauge may then be computed as a comparison of the student's combined performance and Career Code results, to the Mentor's gauge. Internal factor tables may be maintained and used during the computations, which include various interpolations, averaging and other basic statistical manipulations.

Each of the five elements of the Student's STEAM-Gauge (S, T, E, A and M) may be a representation from 1-to-10 of the student performance in those categories as algorithmically compared to the Mentor's STEAM-Gauge. Thus, in the unlikely event that all elements were equally important, all element numbers would be the same, resulting in a circular pie chart graphic. Realistically, however, certain elements will be more/less important than others, resulting in an irregular-shaped 5-element pie chart. An element in the Student's STEAM-Gauge may be stronger that the corresponding element of the Mentor's (although not greater than 10), indicating student strength in that element; or less than the Mentor's, indicating growth potential for the student in that element (for this specific career.) The Student's STEAM-Gauge will become more refined and substantive over time as more student performance data is collected during additional passes through Ideation experiences.

The Engine may perform the STEAM-Gauge calculations. Several variables may be used to calculate the STEAM-Gauge: Mentor's Career Code, Student's Career Code, Mentor's STEAM hard skills profile, Journey Points accumulated from Branching Stories (a measure of the student's interest in the career and/or mentor), and how the student rates the career.

The mentor may be asked to rate the importance of specific hard skills across STEAM. The importance of each skill may be rolled up into a single value between 0.0 and 1.0 for each STEAM category.

The Mentor's Career Code and STEAM hard skills profile may be used to create a Factors Table. A factors table may link the student's Career Code with the Mentor's Career Code and STEAM hard skills profile.

FIG. 15 depicts an exemplary factors table 1500 in accordance with one or more embodiments. The Factors Table may be constructed by comparing two of the top three Career Code personalities types from the mentor, for example, Realistic and Investigative, with the top three personalities in the Student's Career Code. Based on this comparison, a value (multiplier) may be assigned, for example 0.9 if the Mentor and Student have IA in common.

Factors table 1500 illustrates how the multipliers are derived. Two Career Codes are reflected in the table, and they represent the Career Code from two different Digital Forensic Analysts. In this example, both Career Codes are used to derive the table. This improves the granularity of the derived multiple.

FIG. 16 depicts an exemplary hard skills value table 1600 in accordance with one or more embodiments. The next step draws from the Mentor's Hard Skills Profile to create the starting point for the student's STEAM-Gauge. The Mentor's Hard Skills Profile may then be lowered, e.g. lowered to 25 percent of the original value, because the STEAM-Gauge for the student represents their "tendencies" not their hard skills for now. For example, if the importance of Technology for this career is 0.8 (or 80 percent), the Engine may multiply the 0.8 with 025 (25 percent) and arrive at the 0.18 value reflected hard skills value table 1600.

When the student selects a career of interest, the hard skills value table 1600 may be used (in this example, representing the Digital Forensic Analyst career) and the student's Career Code may be used to establish the student's initial STEAM-Gauge values. For example, if the student selects the Digital Forensic Analyst career and two of the first three positions of their Career Code include Investigative and Artistic the values applied to their STEAM-Gauge are S=0.16, T=0.18, E=0.11, A=0.11, and M=0.09, which are highlighted in row 1610 in hard skills value table 1600.

FIG. 17 depicts an exemplary STEAM-Gauge data table 1700 in accordance with one or more embodiments. As the student progresses through the Ideation experience engaging in the Branching Stories, points may be accumulated which represent the student interest in the career and/or mentor. These points may be used to build on the student's initial STEAM-Gauge. For example, if the student accumulates 40 points while engaging in the branching story, and the branching story has a total of 115 points possible, the STEAM-Gauge may be increased by 35 percent, as shown in table 1700. Thus the quiz points may impact the final STEAM-Gauge score by serving as a greater indicator of student interest demonstrated throughout the journey.

The final input to the STEAM-Gauge for a single career selection may be based on how the student rates the career in terms of the student's interest in potentially pursuing the career. A five-star rating system may be used to derive the value. Currently, if the student rates the career with five stars, the student's STEAM-Gauge for that career may be increased by 25 percent. If the student rates it with four stars, the STEAM-Gauge is increased by 20 percent, three stars equates to 15 percent increase, two stars 5 percent, and finally 1 star ratings may not increase the STEAM-Gauge values.

The student may run through the same process for additional careers, for example two additional careers. The same computation method may be used for each subsequent career.

The final step in calculating the STEAM-Gauge may include taking the geometric mean across all careers selected. This may result in an average STEAM-Gauge for the student where they can now compare their STEAM-Gauge (tendencies) with each of the Mentor's STEAM-Gauge.

Figure 18:
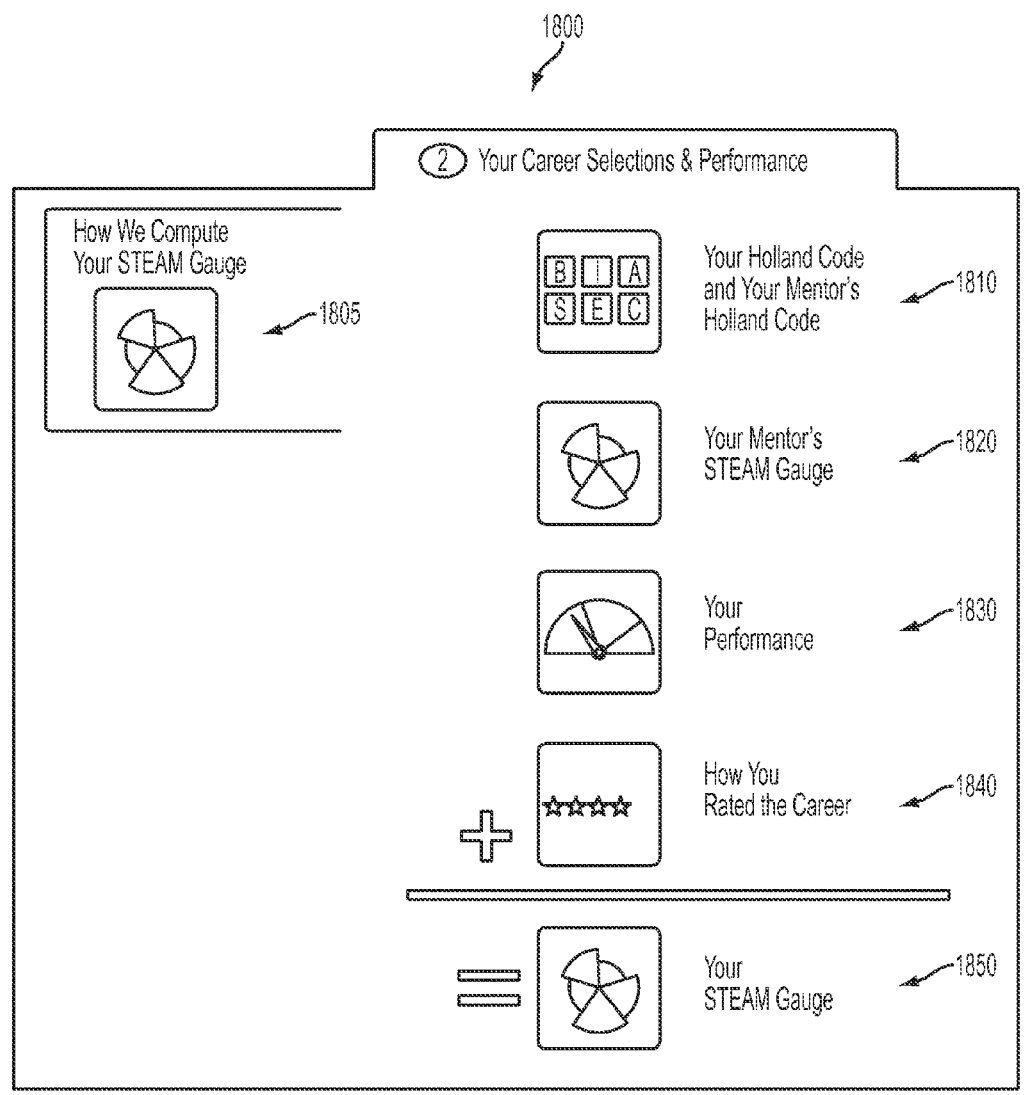
FIG. 18 depicts an exemplary interface 1800 in accordance with one or more embodiments.

FIG. 18 depicts an exemplary interface 1800 in accordance with one or more embodiments. Interface 1800 may include items 1810, 1820, 1830, 1840, and/or 1850. When the user selects item 1805, the user may be presented with information as to how the STEAM-Gauge is computed. When the user selects item 1810, the user may be presented with the student's Career Code and the student's Mentor's Career Code. When the user selects item 1820, the user may be presented with the Mentor's STEAM-Gauge. When the user selects item 1830, the user may be presented with information of the student's performance, such as the information relating to student performance discussed herein. When the user selects item 1840, the user may be presented with the user's ratings of the career. When the user selects item 1850, the user may be presented with the user's STEAM-Gauge.

Figure 19:
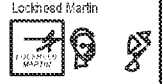
FIG. 19 depicts an exemplary Resume 1900 in accordance with one or more embodiments.

FIG. 19 depicts an exemplary STEM Resume 1900 (which at times may be called a Cyber Resume) in accordance with one or more embodiments. STEM Resume 1900 may include summary information 1910, careers explored 1920, Career Code 1930, STEAM-Gauge 1940, Field Trip Roadmaps 1950, or any combination thereof. Resume 1900 may be a dynamic representation of a student's current skillset performance, career tendencies, and the recommended path for continued exploration. STEM Resume 1900 may be:

Fed by skillset and career performance metrics collected when the student is participating using the platform;
Updated as a student progresses through one or more Journeys
Work with leading schools and certification authorities;
Track and/or display everything the student has done and/or has planned to do
Collect all the certifications into a pre-formatted, pre-defined collection and report
Provide a leader board.

Summary information 1910 may include grade level, field trips taken, number of certifications earned, career objective, the career ranked as the top choice, or any combination thereof. Careers explored 1920 may include those ranked based on self-assigned preferences. Career Code 1930 may include the personality test results map personal preferences to careers that might be of interest to the student. STEAM-Gauge 1940 may show the relative importance of the skills, in Science, Technology, Engineering, Arts, and Math (STEAM) needed to be successful for the student's top career choice. The student's average STEAM-Gauge may be based on interactions with the system and Mentors (via the Mentor Management System) during Ideation. It shows the relative importance for each skills set for that career—the longer the radius, the more important the skills. A student may also compare the student's STEAM-Gauge to that of the Mentor. For example, if the tendencies toward Technology are high, and the career requires more Technology skills, the student could well be on the right career path. Field Trip Roadmaps 1950 may be roadmaps created by mentors that provide a path toward future employment opportunities. The roadmap may provide important assignments, experiences, and hands-on activities that allow the student to make important decisions concerning a future careers.

The STEM Resume may be the culmination of the Ideation experience, wherein the student's collective performance, interest and aptitude indicators are represented in a standard way that may show: career preference; skillset strengths as compared to those of the corresponding career mentor; industry-accepted and meaningful measures of the student's career tendencies; award, badge, and/or certificate achievements from industry companies sponsoring the career journeys; and/or a technology roadmap and/or curriculum of related Field Trips that the student would follow for continued exploration of careers.

The STEM Resume may be dynamic, in that it may: provide continuous representation of these dimensions and attributes as a result of the student's career exploration; start from the very first Ideation experience; continue throughout the numerous follow-on combinations of industry-sponsored Field Trips; and lead to internship and full-time employment opportunities.

The STEM Resume may become the student's passport to future economic success in industry, while simultaneously serving as an overarching guide through the maze of technologies and competing educational pathways.

Teachers, parents and potential employers also benefit from a student's STEM Resume, in that they too are able to see and take action on the dynamic and ever-changing montage of a student's evolving STEM maturity. The STEM Resume may indicate trends in class performance when viewed in aggregate, from which the teacher can tailor subsequent instruction to strengthen needed areas; allow parents to see a dimension of their child's interests and capabilities that they might not have previously been aware of; and allow employers to see authoritative evidence of a student's performance and achievement (e.g., via certifications received).

Figure 20:
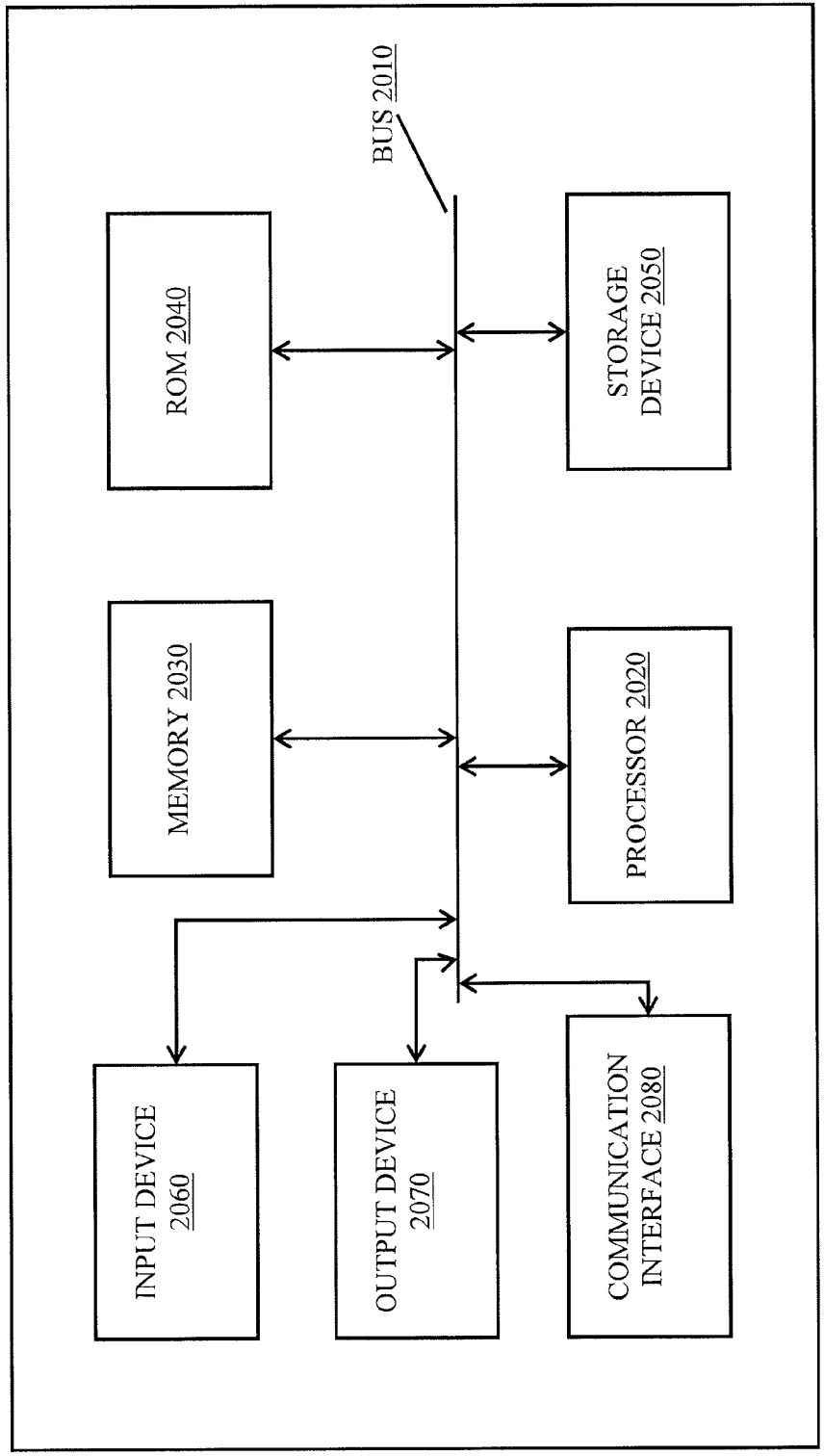
FIG. 20 depicts an exemplary architecture for implementing a computing device in accordance with one or more embodiments.

FIG. 20 depicts an exemplary architecture for implementing a computing device 2000 in accordance with one or more embodiments, which may be used to implement any of the devices discussed herein, or any other computer system or computing device component thereof. It will be appreciated that other devices that can be used with the computing device 2000, such as a client or a server, may be similarly configured. As illustrated in FIG. 20, computing device 2000 may include a bus 2010, a processor 2020, a memory 2030, a read only memory (ROM) 2040, a storage device 2050, an input device 2060, an output device 2070, and a communication interface 2080.

Bus 2010 may include one or more interconnects that permit communication among the components of computing device 2000. Processor 2020 may include any type of processor, microprocessor, or processing logic that may interpret and execute instructions (e.g., a field programmable gate array (FPGA)). Processor 2020 may include a single device (e.g., a single core) and/or a group of devices (e.g., multi-core). Memory 2030 may include a random access memory (RAM) or another type of dynamic storage device that may store information and instructions for execution by processor 2020. Memory 2030 may also be used to store temporary variables or other intermediate information during execution of instructions by processor 2020.

ROM 2040 may include a ROM device and/or another type of static storage device that may store static information and instructions for processor 2020. Storage device 2050 may include a magnetic disk and/or optical disk and its corresponding drive for storing information and/or instructions. Storage device 2050 may include a single storage device or multiple storage devices, such as multiple storage devices operating in parallel. Moreover, storage device 2050 may reside locally on the computing device 2000 and/or may be remote with respect to a server and connected thereto via network and/or another type of connection, such as a dedicated link or channel.

Input device 2060 may include any mechanism or combination of mechanisms that permit an operator to input information to computing device 2000, such as a keyboard, a mouse, a touch sensitive display device, a microphone, a pen-based pointing device, and/or a biometric input device, such as a voice recognition device and/or a finger print scanning device. Output device 2070 may include any mechanism or combination of mechanisms that outputs information to the operator, including a display, a printer, a speaker, etc.

Communication interface 2080 may include any transceiver-like mechanism that enables computing device 2000 to communicate with other devices and/or systems, such as a client, a server, a license manager, a vendor, etc. For example, communication interface 2080 may include one or more interfaces, such as a first interface coupled to a network and/or a second interface coupled to a license manager. Alternatively, communication interface 2080 may include other mechanisms (e.g., a wireless interface) for communicating via a network, such as a wireless network. In one implementation, communication interface 2080 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 2000 may perform certain functions in response to processor 2020 executing software instructions contained in a computer-readable medium, such as memory 2030. In alternative embodiments, hardwired circuitry may be used in place of or in combination with software instructions to implement features consistent with principles of the disclosure. Thus, implementations consistent with principles of the disclosure are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible or non-transitory storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present disclosure should not be limited by any of the above-described exemplary embodiments, but should instead be defined only in accordance with the following claims and their equivalents.

The invention claimed is:

1. A method for providing career guidance to a user through one or more journeys, the method comprising:
generating a user profile of the user by:
recording, in a computer-readable database, attention and fact retention metrics of the user after the user is presented with one or more career videos, the attention and fact retention metrics being based on responses to career video questions presented to the user;
recording, in the computer-readable database, career tendency assessment metrics provided by the user during a career tendency assessment; and
recording, in the computer-readable database a career selected by the user;
generating, via a processor and based on the attention and fact metrics, the career tendency assessment metrics, and the career selected by the user, a career code;
identifying, in a mentor knowledge database and based on the career code, a mentor associated with the career selected by the user;
retrieving, from the mentor knowledge database, a mentor gauge associated with the mentor, the mentor gauge having scores for science, technology, engineering, art, and math;
presenting, via a display device, a virtual field trip associated with the career selected by the user, the virtual field trip comprising a plurality of screens and applications windows associated with the career;
while the virtual field trip is being presented, presenting questions to the user regarding the virtual field trip;
receiving, while the virtual field trip is being presented, response to the questions from the user;
generating, via the processor, a student gauge based on the responses and the attention and fact retention metrics, the student gauge having scores for science, technology, engineering, art, and math;
comparing, via the processor, the student gauge and the mentor gauge, to yield a comparison, the comparison generating comparison values between respective scores for each of science, technology, engineering, art, and math; and
generating, via the processor, a report explaining the comparison.

2. The method of claim 1, wherein the attention and fact retention metrics comprise:
a measure of time that the user spends viewing a video;
a percentage of the video that was viewed;
a number of times the video has been viewed;
a degree of accuracy of the responses to questions posed during a mentor interaction by the mentor during one or more branching stories associated with the virtual field trip; and
a measure of student positive responses and continuation responses during the one or more branching stories.

3. The method of claim 1 further comprising:
recording, in the user profile, ratings received from the user regarding the career selected by the user.

4. The method of claim 1, wherein the mentor is a professional working in a science, technology, engineering, mathematics, or cyber career; and
wherein the one or more journeys comprise interactive media experiences designed to motivate students to pursue careers in at least one of science, technology, engineering, mathematics, and cyber technology.

5. The method of claim 1, further comprising receiving, with the responses to the questions regarding the virtual field trip, virtual field trip data comprising:
a skill associated with virtual field trip;
a degree of importance of the skill for the career selected by the user;
a simulated tool usage for a tool demonstrated in the virtual field trip;
a degree of importance of the simulated tool usage to the virtual field trip;
a duration of interaction of the user with the virtual field trip; and
at least one of user likes and user dislikes.

6. The method of claim 1, wherein the virtual field trip has one or more skills associated with virtual field trip, with weights corresponding to each of the one or more skills, and wherein one or more test scores are generated, via the processor, based on performance of the user with respect to the one or more skills during presentation of the virtual field trip.

7. The method of claim 6, wherein the one or more skills, the weights corresponding to each of the one or more skills, and the one or more test scores are stored in a data attribution table.

8. The method of claim 1, wherein the virtual field trip is has a corresponding branching story.

9. The method of claim 8, wherein the corresponding branching story comprises a situational learning scenario that provides a mentor management system guidance for providing the virtual field trip, the guidance comprising an order in which to present virtual field trip content based on user responses received.

10. The method of claim 1, wherein the virtual field trip is developed by a sponsoring company.

11. The method of claim 1, wherein the virtual field trip is retrieved from a database storing a plurality of virtual field trips.

12. The method of claim 11, wherein the plurality of virtual field trips are classified into levels of increasing complexity.

13. The method of claim 1, further comprising:
presenting the report to the user, via the display device, after the virtual field trip is completed.

14. The method of claim 1, wherein
the questions presented during the virtual field trip are dynamically generated using the mentor knowledge database in accordance with a branching story.

15. The method of claim 1, wherein during the presenting of the virtual field trip, delivered guidance delivered by a subject matter expert of a corporate sponsor virtual field trip.

16. The method of claim 1 further comprising:
providing, to the user, access to a virtual office for interacting with mentors and participating in additional virtual field trips.

17. The method of claim 16, wherein the virtual office comprises:
a virtual workstation for receiving the responses during the virtual field trip;
one or more field trip objects placed in the virtual office, the one or more field trip objects relating to specific virtual field trip exercises and which may be selectable by the user for further study;
a whiteboard that displays messages from the mentor;
a window image showing a corporate location; and
company branding.

18. The method of claim 1, wherein the virtual field trip is generated by a wizard module, the wizard module being configured to:
provide an interface for receiving career skill selections and virtual field trip value assignments;
receive importance factors for each career skill selection, the importance factors indicating a relative importance of each career skill selection to a subject career role;
construct the virtual field trip based on the career skill selections, the importance factors, and the virtual field trip value assignments.

19. The method of claim 18, wherein the career skill selections comprise at least one of hard skills, soft skills, entrepreneurial skills, and tools.

20. The method of claim 1, wherein the report comprises summary information, careers explored by the user, the career code, the student gauge, achievement and accomplishment awards, and a virtual field trip roadmap.

21. The method of claim 1, wherein the report comprises a display of a science score, a technology score, an engineering score, an art score, and a math score.

22. The method of claim 21, wherein the science score, the technology score, the engineering score, the art score, and the math score are based on the career code, the mentor gauge, points accumulated from branching stories, and user career ratings.

23. A system for providing career guidance to a user through one or more journeys, system comprising:
a display device;
a processor; and
a computer-readable storage medium having instructions stored which, when executed by the processor, cause the processor to perform operations comprising:
generating a user profile of the user by:
recording, in a computer-readable database, attention and fact retention metrics of the user after the user is presented with one or more career videos, the attention and fact retention metrics being based on responses to career video questions presented to the user;
recording, in the computer-readable database, career tendency assessment metrics provided by the user during a career tendency assessment; and
recording, in the computer-readable database a career selected by the user;
generating, based on the attention and fact metrics, the career tendency assessment metrics, and the career selected by the user, a career code;
identifying, in a mentor knowledge database and based on the career code, a mentor associated with the career selected by the user;
retrieving, from the mentor knowledge database, a mentor gauge associated with the mentor, the mentor gauge having scores for science, technology, engineering, art, and math;
presenting, via the display device, a virtual field trip associated with the career selected by the user, the virtual field trip comprising a plurality of screens and applications windows associated with the career;
while the virtual field trip is being presented, presenting questions to the user regarding the virtual field trip;
receiving, while the virtual field trip is being presented, responses to the questions from the user;
generating a student gauge based on the responses and the attention and fact retention metrics, the student gauge having scores for science, technology, engineering, art, and math;
comparing the student gauge and the mentor gauge, to yield a comparison, the comparison generating comparison values between respective scores for each of science, technology, engineering, are, and math; and
generating a report explaining the comparison.

24. The system of claim 23, wherein the attention and fact retention metrics comprises:
a measure of time that the user spends viewing a video;
a percentage of the video that was viewed;
a number of times the video has been viewed;
a degree of accuracy of the responses to questions posed during a mentor interaction by the mentor during one or more branching stories associated with the virtual field trip; and
a measure of student positive responses and continuation responses during the one or more branching stories.

25. The system of claim 23, the computer-readable storage medium having additional instructions stored which, when executed by the processor, cause the processor to perform operations comprising:

recording, in the user profile, ratings received from the user regarding the career selected by the user.

26. The system of claim 23, wherein the mentor is a professional working in a science, technology, engineering, mathematics, or cyber career; and wherein the one or more journeys comprise interactive media experiences designed to motivate students to pursue careers in at least one of science, technology, engineering, mathematics, and cyber technology.

27. The system of claim 23, the computer-readable storage medium having additional instructions stored which, when executed by the processor, cause the processor to perform operations comprising:

receiving, with the responses to the questions regarding the virtual field trip, virtual field trip data comprising:
a skill associated with the virtual field trip;
a degree of importance of the skill for the career selected by the user;
a simulated tool usage for a tool demonstrated in the virtual field trip;
a degree of importance of the simulated tool usage to the virtual field trip;
a duration of interaction of the user with the virtual field trip; and
at least one of user likes and user dislikes.

28. The system of claim 23, wherein the virtual field trip has one or more skills associated with virtual field trip, with weights corresponding to each of the one or more skills, and wherein one or more test scores are generated, via the processor, based on performance of the user with respect to the one or more skills during presentation of the virtual field trip.

29. The system of claim 28, wherein the one or more skills, the weights corresponding to each of the one or more skills, and the one or more test scores are stored in a data attribution table.

30. The system of claim 23, wherein the virtual field trip is has a corresponding branching story.

31. The system of claim 30, wherein the corresponding branching story comprises a situational learning scenario that provides a mentor management system guidance for providing the virtual field trip, the guidance comprising an order in which to present virtual field trip content based on user responses received.

32. The system of claim 23, wherein the virtual field trip is developed by a sponsoring company.

33. The system of claim 23, wherein the virtual field trip is retrieved from a database storing a plurality of virtual field trips.

34. The system of claim 33, wherein the plurality of virtual field trips are classified into levels of increasing complexity.

35. The system of claim 23, wherein the system is further configured to:
presenting the report to the user, via the display device, after the virtual field trip is completed.

36. The system of claim 23, wherein
the questions presented during the virtual field trip are dynamically generated using the mentor knowledge database in accordance with a branching story.

37. The system of claim 23, wherein during the presenting of the virtual field trip, delivered guidance delivered by a subject matter expert of a corporate sponsor virtual field trip.

38. The system of claim 23, the computer-readable storage medium having additional instructions stored which, when executed by the processor, cause the processor to perform operations comprising:

provide the user access to a virtual office for interacting with mentors and participating in additional virtual field trips.

39. The system of claim 38, wherein the virtual office comprises:
a virtual workstation for receiving the responses during the virtual field trip;
one or more field trip objects placed in the virtual office, the one or more field trip objects relating to specific virtual field trip exercises and which may be selectable by the user for further study;
a whiteboard that displays messages from the mentor;
a window image showing a corporate location; and
company branding.

40. The system of claim 23, wherein the virtual field trip is generated by a wizard module, the wizard module being configured to:
provide an interface for receiving career skill selections and virtual field trip value assignments;
receive importance factors for each career skill selection, the importance factors indicating a relative importance of each career skill selection to a subject career role;
construct the virtual field trip based on the career skill selections, the importance factors, and the virtual field trip value assignments.

41. The system of claim 40, wherein the career skill selections comprise at least one of hard skills, soft skills, entrepreneurial skills, and tools.

42. The system of claim 23, wherein the report comprises summary information, careers explored by the user, the career code, the student gauge, achievement and accomplishment awards, and a virtual field trip roadmap.

43. The system of claim 23, wherein the report comprises a display of a science score, a technology score, an engineering score, an art score, and a math score.

44. The system of claim 43, wherein the science score, the technology score, the engineering score, the art score, and the math score are based on the career code, the mentor gauge, points accumulated from branching stories, and user career ratings.

45. A non-transitory computer readable storage medium having instructions stored which, when executed by a computing device, cause the computing device to perform operations comprising:

generating a user profile of the user by:
recording, in a computer-readable database, attention and fact retention metrics of the user after the user is presented with one or more career videos, the attention and fact retention metrics being based on responses to career video questions presented to the user;
recording, in the computer-readable database, career tendency assessment metrics provided by the user during a career tendency assessment; and
recording, in the computer-readable database a career selected by the user;

generating, based on the attention and fact metrics, the career tendency assessment metrics, and the career selected by the user, a career code;

identifying, in a mentor knowledge database and based on the career code, a mentor associated with the career selected by the user;

retrieving, from the mentor knowledge database, a mentor gauge associated with the mentor, the mentor gauge having scores for science, technology, engineering, art, and math;

presenting, via the display device, a virtual field trip associated with the career selected by the user, the virtual field trip comprising a plurality of screens and applications windows associated with the career;

while the virtual field trip is being presented, presenting questions to the user regarding the virtual field trip;

receiving, while the virtual field trip is being presented, responses to the questions from the user;

generating a student gauge based on the responses and the attention and fact retention metrics, the student gauge having scores for science, technology, engineering, art, and math;

comparing the student gauge and the mentor gauge, to yield a comparison, the comparison generating comparison values between respective scores for each of science, technology, engineering, art, and math; and generating a report explaining the comparison.

* * * * *